US010839577B2

(12) United States Patent
Horie et al.

(10) Patent No.: US 10,839,577 B2
(45) Date of Patent: Nov. 17, 2020

(54) CREATING AUGMENTED REALITY SELF-PORTRAITS USING MACHINE LEARNING

(71) Applicant: Apple Inc., Cupertino, CA (US)

(72) Inventors: Toshihiro Horie, San Jose, CA (US); Kevin O'Neil, San Francisco, CA (US); Zehang Sun, Saratoga, CA (US); Xiaohuan Corina Wang, Los Altos, CA (US); Joe Weil, Greenbrae, CA (US); Omid Khalili, Santa Clara, CA (US); Stuart Mark Pomerantz, Stevenson Ranch, CA (US); Marc Robins, Minneapolis, MN (US); Eric Beale, Los Angeles, CA (US); Nathalie Castel, Sunnyvale, CA (US); Jean-Michel Berthoud, San Jose, CA (US); Brian Walsh, Sunnyvale, CA (US); Andy Harding, Portola Valley, CA (US); Greg Dudey, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/177,408

(22) Filed: Oct. 31, 2018

(65) Prior Publication Data
US 2019/0080498 A1 Mar. 14, 2019

Related U.S. Application Data

(63) Continuation-in-part of application No. 16/124,168, filed on Sep. 6, 2018.
(Continued)

(51) Int. Cl.
*H04N 5/272* (2006.01)
*G06T 11/60* (2006.01)
(Continued)

(52) U.S. Cl.
CPC ............ *G06T 11/60* (2013.01); *G06T 3/4053* (2013.01); *G06T 5/002* (2013.01); *G06T 7/194* (2017.01);
(Continued)

(58) Field of Classification Search
None
See application file for complete search history.

(56) References Cited

U.S. PATENT DOCUMENTS 8,339,418 B1  12/2012  Nesmith et al.
9,237,244 B2   1/2016  Silverbrook
(Continued)

FOREIGN PATENT DOCUMENTS

WO  WO2016/183629   11/2016
WO  WO 2018/130909   7/2018

OTHER PUBLICATIONS

International Search Report and Written Opinion in International Application No. PCT/US2018/049930, dated Feb. 11, 2019, 21 pages.
(Continued)

*Primary Examiner* — Twyler L Haskins
*Assistant Examiner* — Wesley J Chiu
(74) *Attorney, Agent, or Firm* — Fish & Richardson P.C.

(57) ABSTRACT

Systems, methods, apparatuses and non-transitory, computer-readable storage mediums are disclosed for generating AR self-portraits or "AR selfies." In an embodiment, a method comprises: capturing, by a first camera of a mobile device, image data, the image data including an image of a subject in a physical, real-world environment; receiving, by a depth sensor of the mobile device, depth data indicating a distance of the subject from the camera in the physical, real-world environment; receiving, by one or more motion sensors of the mobile device, motion data indicating at least
(Continued)

an orientation of the first camera in the physical, real-world environment; generating a virtual camera transform based on the motion data, the camera transform for determining an orientation of a virtual camera in a virtual environment; and generating a composite image data, using the image data, a matte and virtual background content selected based on the virtual camera orientation.

20 Claims, 28 Drawing Sheets

Related U.S. Application Data

(60) Provisional application No. 62/556,297, filed on Sep. 8, 2017.

(51) Int. Cl.
    *G06T 5/00*     (2006.01)
    *G06T 3/40*     (2006.01)
    *H04N 5/232*     (2006.01)
    *G06T 7/194*     (2017.01)
    *G06T 11/00*     (2006.01)

(52) U.S. Cl.
    CPC ....... *G06T 11/00* (2013.01); *H04N 5/232933* (2018.08); *H04N 5/232935* (2018.08); *H04N 5/272* (2013.01); *G06T 2207/20084* (2013.01); *G06T 2207/30201* (2013.01)

(56) References Cited

U.S. PATENT DOCUMENTS

| | | | |
|---|---|---|---|
| 9,432,625 B2 | 8/2016 | Delegue et al. | |
| 9,584,729 B2 | 2/2017 | Amtrup et al. | |
| 2007/0133880 A1* | 6/2007 | Sun | G06K 9/38 382/195 |
| 2008/0307307 A1* | 12/2008 | Ciudad | G06T 13/80 715/719 |
| 2009/0315915 A1* | 12/2009 | Dunn | H04M 1/72544 345/632 |
| 2010/0302376 A1* | 12/2010 | Boulanger | G06K 9/34 348/164 |
| 2011/0211749 A1* | 9/2011 | Tan | G06T 7/11 382/154 |
| 2011/0285910 A1* | 11/2011 | Bamji | H04N 13/271 348/631 |
| 2013/0230237 A1* | 9/2013 | Schlosser | G06T 7/10 382/164 |
| 2013/0265382 A1 | 10/2013 | Guleryuz et al. | |
| 2014/0354690 A1 | 12/2014 | Walter et al. | |
| 2015/0254868 A1* | 9/2015 | Srikanth | G06T 7/194 348/47 |
| 2015/0269740 A1* | 9/2015 | Mazurenko | G06T 7/11 382/173 |
| 2015/0348326 A1 | 12/2015 | Sanders et al. | |
| 2016/0050169 A1 | 2/2016 | Atar et al. | |
| 2016/0073040 A1* | 3/2016 | Jen | G06K 9/00362 348/239 |
| 2016/0343166 A1 | 11/2016 | Inoko et al. | |
| 2017/0085834 A1 | 3/2017 | Kim et al. | |
| 2017/0124717 A1* | 5/2017 | Baruch | G06T 7/187 |
| 2017/0244908 A1* | 8/2017 | Flack | G06K 9/00234 |
| 2018/0249062 A1 | 8/2018 | Jin et al. | |
| 2019/0035125 A1 | 1/2019 | Bellows et al. | |
| 2019/0082118 A1 | 3/2019 | Wang et al. | |
| 2019/0340432 A1* | 11/2019 | Mousavian | G06K 9/4628 |

OTHER PUBLICATIONS

International Invitation to Pay Additional Fees and, Where Applicable, Protest Fees, in International Application No. PCT/US2018/049930, dated Dec. 12, 2018, 5 pages.

Wang et al., "Automatic Real-Time Video Matting Using Time-of-Flight Camera and Multichannel Poisson Equations," Int. J. Comput. Vis., 2012, 97: 104-121.

Suzuki and Abe, "Topological Structural Analysis of Digitized Binary Images by Border Following," CVGIP, 1985, 32-46.

Greig et al., "Exact maximum a posteriori estimation for binary images," Journal of the Royal Statistical Society Series B, 1989, 51: 271-279.

\* cited by examiner

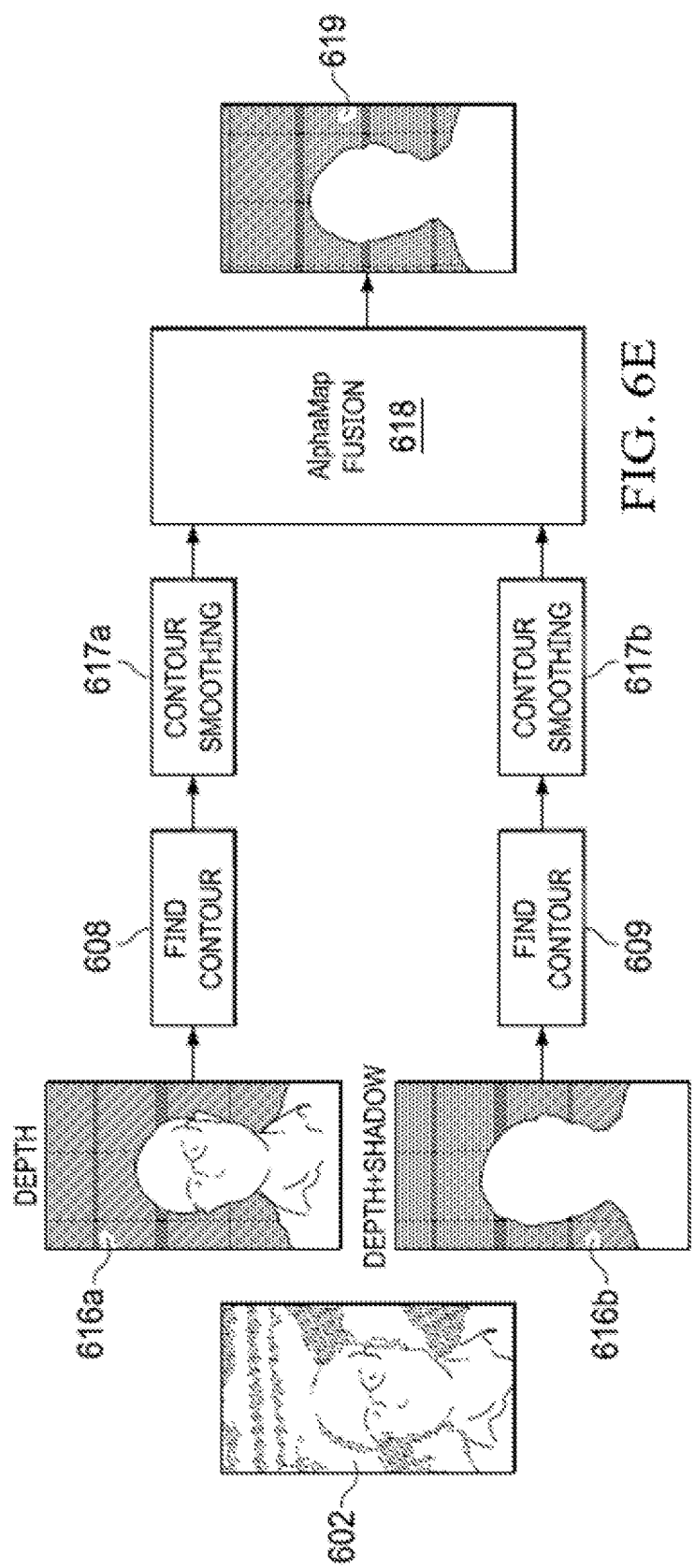

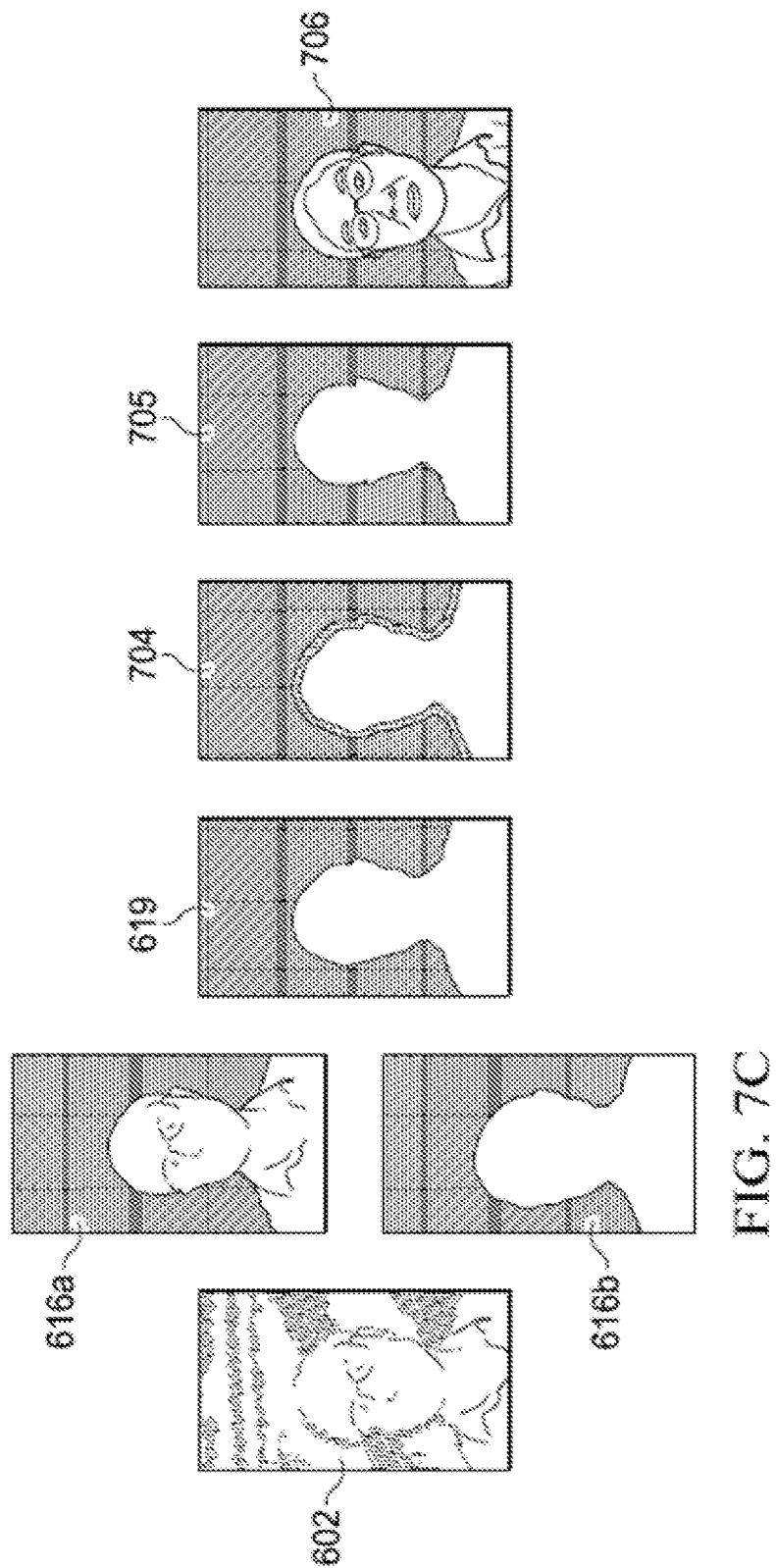

CREATING AUGMENTED REALITY SELF-PORTRAITS USING MACHINE LEARNING

CROSS-REFERENCE TO RELATED APPLICATION

This application is a continuation-in-part of U.S. patent application Ser. No. 16/124,168, entitled "Augmented Reality Self-Portraits," filed on Sep. 6, 2018, which claims priority to U.S. Provisional Patent Application No. 62/556,297, filed Sep. 8, 2017, the entire contents of each of which are incorporated herein by reference.

TECHNICAL FIELD

This disclosure relates generally to media editing and augmented reality.

BACKGROUND

Self-portrait digital photos or "selfies" have become a pop-culture phenomenon. Selfies are typically taken with a digital camera or smart phone held at arm's length, pointed at a mirror or attached to a selfie stick to position the camera farther away from the subject and capture the background scene behind the subject. Selfies are often shared on social networking services (e.g., Facebook®, Instagram®, Twitter®). Augmented reality (AR) is a live view of a physical, real-world environment whose elements are "augmented" by computer-generated sensory input such as sound, video or graphics.

SUMMARY

Systems, methods, apparatuses and non-transitory, computer-readable storage mediums are disclosed for generating AR self-portraits or "AR selfies."

In an embodiment, a method comprises: capturing, by a first camera of a mobile device, image data, the image data including an image of a subject in a physical, real-world environment; receiving, by a depth sensor of the mobile device, depth data indicating a distance of the subject from the camera in the physical, real-world environment; receiving, by one or more motion sensors of the mobile device, motion data indicating at least an orientation of the first camera in the physical, real-world environment; generating, by one or more processors of the mobile device, a virtual camera transform based on the motion data, the camera transform for determining an orientation of a virtual camera in a virtual environment; generating, by the one or more processors, a matte from the image data and the depth data, wherein generating the matte includes: generating, by a neural network, a low-resolution matte; and processing the low-resolution matte to remove artifacts in the low-resolution matte; generating high-resolution matte from the processed low-resolution matte, where the high-resolution matte has higher resolution than the low-resolution matte; generating, by the one or more processors, a composite image data, using the image data, the high-resolution matte and a virtual background content, the virtual background content selected from the virtual environment using the camera transform; and causing to display, by the one or more processors, the composite image data on a display of the mobile device.

In an embodiment, the step of processing the low-resolution matte to remove artifacts in the low-resolution matte, further comprises: generating an inner matte and an outer matte from at least one of a bounding box including a face of the subject or a histogram of the depth data; generating a hole-filled matte from the inner matte; generating a shoulder/torso matte from the hole-filled matte; dilating the inner matte using a first kernel; dilating the outer matte using a second kernel smaller than the first kernel; generating a garbage matte from an intersection of the dilated inner matte and the dilated outer matte; combining the low-resolution matte with the garbage matte to create a face matte; combining the face matte and the shoulder/torso matte into a composite low-resolution matte; generating the high-resolution matte from the composite low-resolution matte; applying a temporal filter to the high-resolution matte to generate a final matte; and generating the composite image data, using the image data, the final matte and the virtual background content.

Other embodiments are directed to systems, method, apparatuses and non-transitory, computer-readable mediums.

Particular implementations disclosed herein provide one or more of the following advantages. The user experience of creating a selfie on a mobile device is improved by allowing the user to capture and record a selfie video using a forward-facing or reverse-facing camera embedded in the mobile device, and automatically replace the real-world background captured in a live video preview user-selected virtual background content that automatically updates in response to motion data from motion sensors of the mobile device. The disclosed implementations therefore provide an interactive and entertaining process for capturing selfie images that can be shared with friends and family through social networks.

The details of the disclosed implementations are set forth in the accompanying drawings and the description below. Other features, objects and advantages are apparent from the description, drawings and claims.

DESCRIPTION OF DRAWINGS

FIGS. 6A-6L illustrate a multi-stage process for generating a preprocessed (coarse) matte using depth data, according to an embodiment.

FIGS. 7A-7C illustrate a refined matting process using video data and the preprocessed (coarse) matte, according to an embodiment.

The same reference symbol used in various drawings indicates like elements.

DETAILED DESCRIPTION

Figure 1:
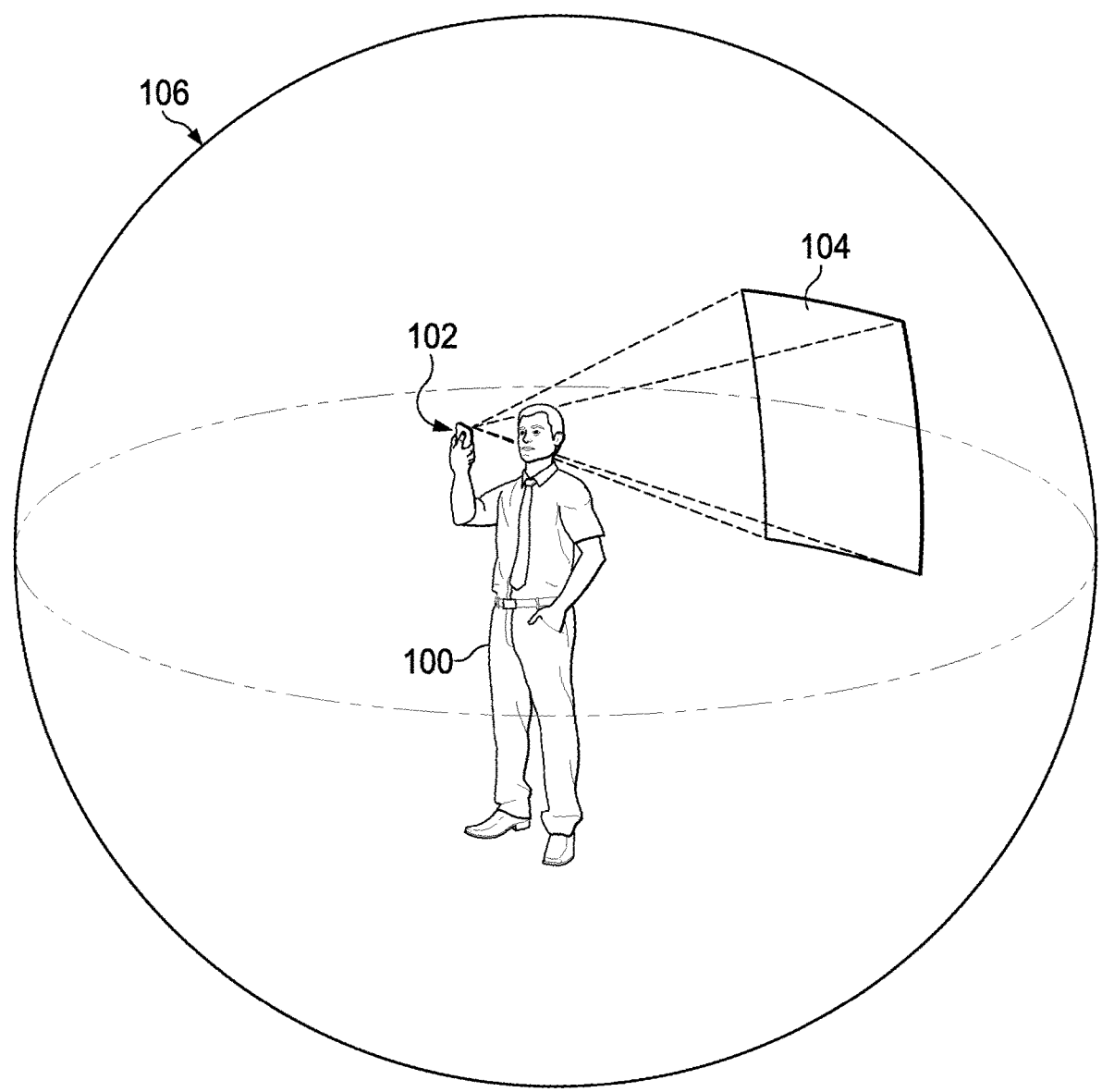
FIG. 1 is a conceptual drawing illustrating the basic concept of an AR selfie, according to an embodiment.

A "selfie" is a self-portrait image taken by a user, often in close proximity by holding a camera within arms-length or using an extension device, such as a "selfie" stick. The selfie subject is often of the user's face, or a portion of the user (e.g., the user's upper body) and any background visible behind the user. A forward-facing camera is a camera that is facing the user as they are viewing the display screen. Alternatively, a backward-facing camera is facing away from the user as they are viewing the display screen, and captures images of the real-world environment in front of, and in the opposite direction, of the user. A typical mobile device for capturing selfies is a digital camera, a smart phone with one or more embedded digital cameras or a tablet computer with one or more embedded cameras.

In an embodiment, a selfie subject can be composited with virtual background content extracted from a virtual environment data model. The virtual background content can include but is not limited to: a two-dimensional (2D) image, a three-dimensional (3D) image and 360° video. In a pre-processing stage, a coarse matte is generated from depth data provided by a depth sensor and then refined using video data (e.g., RGB video data). In an embodiment, the depth sensor is an infrared (IR) depth sensor embedded in the mobile device. The matte is composited (e.g., using alpha compositing) with the video data containing an image of the selfie subject, and the real-world background behind the subject is replaced and continuously updated with virtual background content selected from a virtual environment selected by the user. The virtual background content is selected using a virtual camera transform generated using motion data from one or more motion sensors of the mobile device (e.g., accelerometers, gyroscopes). The video data, refined matte, virtual background content and optionally one or more animation layers are composited to form an AR selfie video. The AR selfie video is displayed to the user by a viewport of the mobile device.

In an embodiment, the mobile device also includes a backward-facing camera that can be used to capture video in front of the user, and which can be processed in a similar manner as video captured the forward-facing camera. A camera flip signal provided by the operating system of the mobile device can indicate, which camera is capturing video, and that signal can be used to adjust the virtual camera transform to update the virtual background content.

A matte generation process is disclosed that uses undefined depth data (also referred to herein as "shadow data") to segment a depth image (e.g., binary depth matte) into foreground and background regions. The matte contains coverage information that includes a contour of the subject being drawn, making it possible to distinguish between parts of the binary depth matte where the subject was actually drawn and other parts of the binary depth matte that are empty. In an embodiment, the matte generation process uses a region-growing algorithm and/or a 3D face mesh to identify and fill "holes" (undefined depth data) in the matte caused by sunlight reflecting off sunglasses worn by the subject.

Although the matte generation process is disclosed herein as part of an AR selfie generation process, the disclosed matte generation process can be used to generate mattes from depth data for any image processing application. For example, the disclosed matte generation process can be used to segment images as a part of a video/image editing tool.

In an embodiment, the virtual environment can be any desired environment, such as a famous city (e.g., London, Paris or New York), and include famous landmarks (e.g., Big Ben, London Bridge, Eifel Tower). The virtual environment can also be completely fictional, such as a cartoon environment complete with cartoon characters, flying saucers and any other desired props. In an embodiment, motion effects (e.g., blurring effects, glowing effects, and cartoon effects) can be applied to one or more of the video data, the virtual background content and the matte. Motion effects can also be applied to the final composite video. In an embodiment, one or more animation layers (e.g., a layer of animated particles resembling snow falling or sparks) can be composited with the video data, the matte and the virtual background content.

In an embodiment, a selfie GUI includes various controls, such as a control for recording an AR selfie video to a storage device (e.g., flash memory of the mobile device), a control for turning one or more microphones of the mobile device on and off, a camera reversal button for switching between forward-facing and backward-facing cameras and a tray for storing thumbnail images of AR selfie videos that can be selected to retrieve and playback the corresponding video on the mobile device.

Overview of AR Selfie Concept

FIG. 1 is a conceptual drawing illustrating the concept of an AR selfie, according to an embodiment. User 100 is shown taking a selfie using a forward-facing camera of mobile device 102. During recording, a viewport on mobile device 102 displays a live video feed of user 100 in the foreground with virtual background content 104 extracted from virtual environment 106. When user 100 changes the orientation of mobile device 102 in the real-world (e.g., rotates the view direction of the camera), motion sensors (e.g., accelerometers, gyros) of mobile device 102 sense the change and generate motion data that is used to update virtual background content 104 with new virtual background content extracted from a different portion of virtual environment 106, as described further in reference to FIGS. 2A-2E. The portion extracted from virtual background content 104 depends on how user 100 is holding mobile device 102. For example, if user 100 is holding mobile device 102 in "portrait" orientation when taking a selfie, then the portion extracted from virtual background content 104 will have an aspect ratio that will fill the viewport in a portrait or vertical orientation. Similarly, if user 100 is holding mobile device 102 in "landscape" orientation when taking a selfie, then the portion extracted from virtual background content 104 will have an aspect ratio that will fill the viewport in a landscape or horizontal orientation.

Example Mapping of a Virtual Environment

Figure 2A:
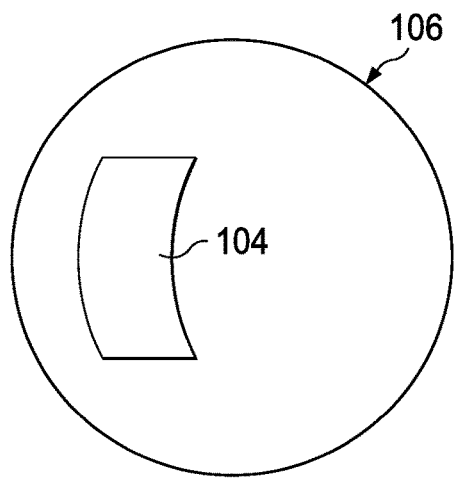
FIGS. 2A-2E illustrate mapping of a virtual environment to a mobile device viewport, according to an embodiment.
Figure 2B:
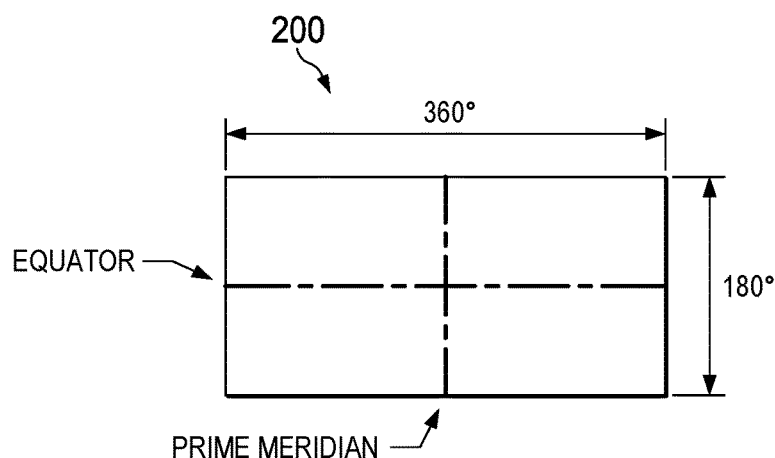

FIGS. 2A-2E illustrate mapping of a virtual environment to a viewport of a mobile device, according to an embodiment. FIG. 2A shows unit sphere 106 with corners of viewport 202 (FIG. 2C) projected onto its surface. FIG. 2B shows an equirectangular projection 200 (e.g., a Mercator projection) that is generated by mapping the projected viewport 202 from a spherical coordinate system to a planar coordinate system. In an embodiment, the horizontal line dividing equirectangular projection 200 is the equator of unit sphere 106 and the vertical line dividing equirectangular projection 200 is the prime meridian of unit sphere 106. The width of equirectangular projection 200 spans from 0° to 360° and the height spans 180°.

Figure 2C:
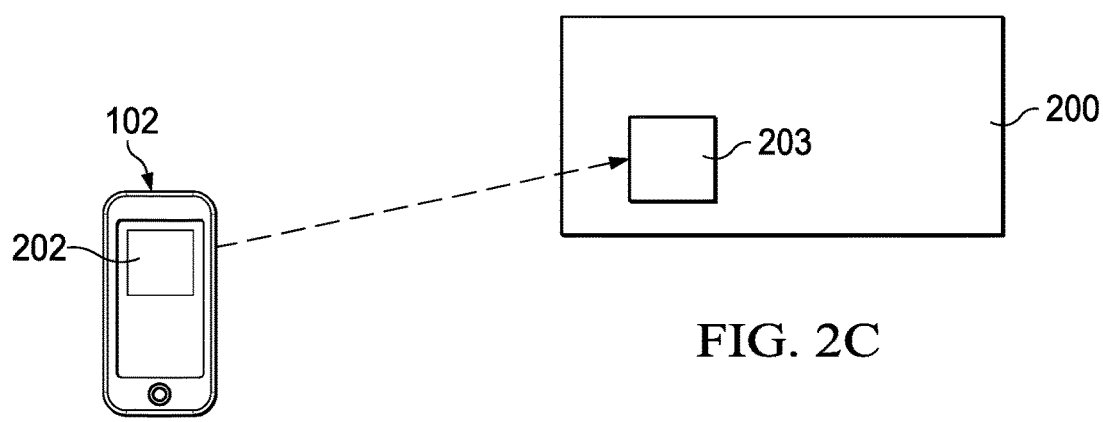

FIG. 2C shows subrectangle 203 overlying equirectangular projection 200. Subrectangle 203 represents viewport 202 of mobile device 102 in planar coordinates. Equirectangular projection 200 can be sampled into viewport 202 using Equations [1] and [2] with reference to FIG. 2E:

$$\phi = \operatorname{atan}\left(\frac{y_c}{x_c}\right), \text{latitude} \quad [1]$$

$$\lambda = \operatorname{acos}(z_c), \text{longitude} \quad [2]$$

Figure 2D:
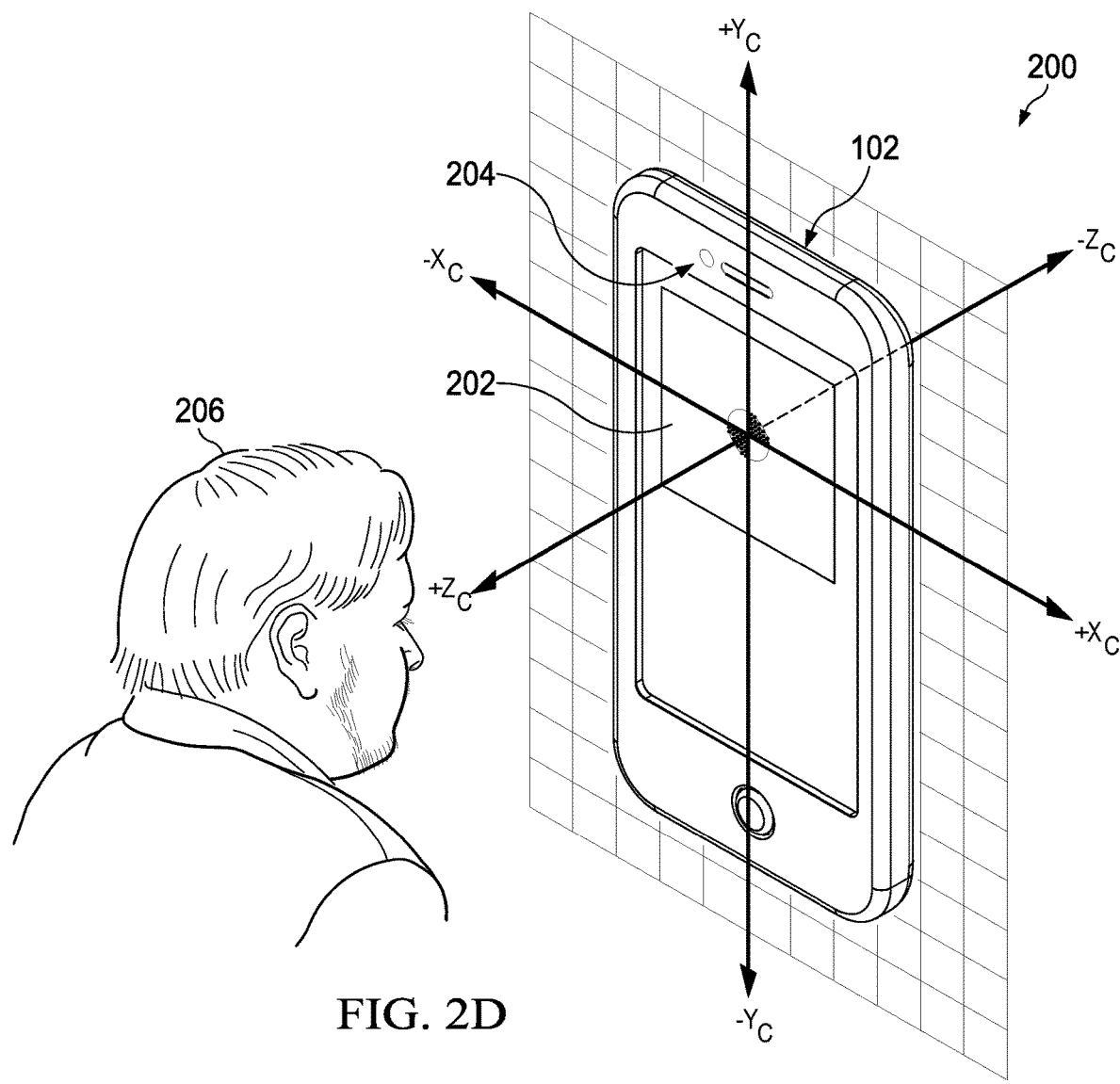
Figure 2E:
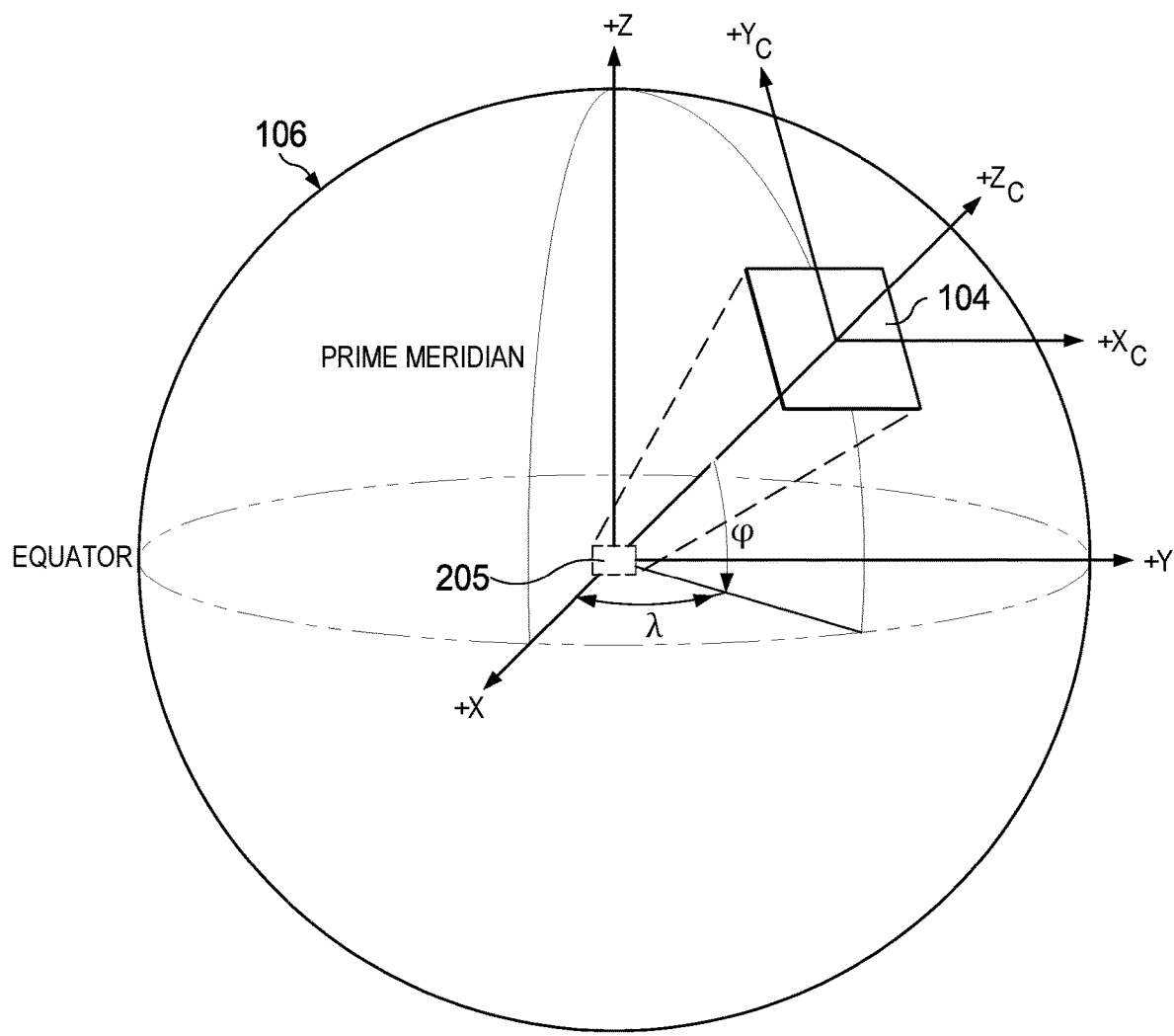

FIG. 2D illustrates mobile device 102 with viewport 202 and forward-facing camera 204. A viewing coordinate system ($X_c$, $Y_c$, $Z_c$) is shown where the $+Z_c$ coordinate is the forward-facing camera's view direction. In computer graphics, a camera analogy is used where viewer 206 located at a view reference point (VRP) observes a virtual environment through virtual camera 205 and can look and move around the virtual environment. This is accomplished by defining a viewing coordinate system (VCS) which has the position and orientation of virtual camera 205, as shown in FIGS. 2D and 2E. In FIG. 2E, virtual camera 205 is shown as fixed position to the origin and has a latitude (φ) and longitude (λ) in a virtual world coordinate system. One can imagine virtual camera 205 looking out at unit sphere 106 with an image of the virtual backward-facing camera in the –Z direction as shown in FIG. 2D. For forward-facing camera 204, virtual camera 205 is rotated by 180° (about the Y axis in FIG. 2D) to generate a forward-facing camera view in the +Z direction, which shows the virtual background "over the shoulder" of viewer 206.

In an embodiment, an attitude quaternion generated by an attitude processor of mobile device 102 can be used to determine the view direction of the backward-facing and forward-facing cameras. When viewer 206 rotates mobile device 102, the motion sensors (e.g., gyroscopes) sense the rotation or rotation rate and update the attitude quaternion of mobile device 102. The updated attitude quaternion (e.g., a delta quaternion) can be used to derive a camera transform for determining the camera view direction in the virtual environment for a backward-facing camera, or can be further transformed by 180° for determining the camera view direction in the virtual environment for a forward-facing camera.

The mathematics for deriving the camera transform are well-known in computer graphics and will not be discussed further herein. An important feature of the disclosed embodiments, however, is that the real-world orientation of the real-world cameras are used to drive the orientation of the virtual camera in the virtual environment, the result being that as the view direction of the real-world camera changes in real-time, the virtual camera view direction (represented by the camera transform) also changes in sync with the real-world camera. As will be described below, this technique creates the illusion that the user is taking a selfie in virtual environment 106 (FIG. 1), and therefore capturing the virtual background behind the user rather than the real-world background. In an embodiment, when a user first enters the scene the device orientation (e.g., azimuth, elevation) can be biased towards a portion of the scene that is visually impressive (referred to as a "hero angle"). For example, a delta can be applied to the device orientation when the user looks around the scene, with the delta calculated as the difference between the hero angle and the device orientation when the user enters the scene.

Example GUIs for Recording AR Selfies

Figure 3A:
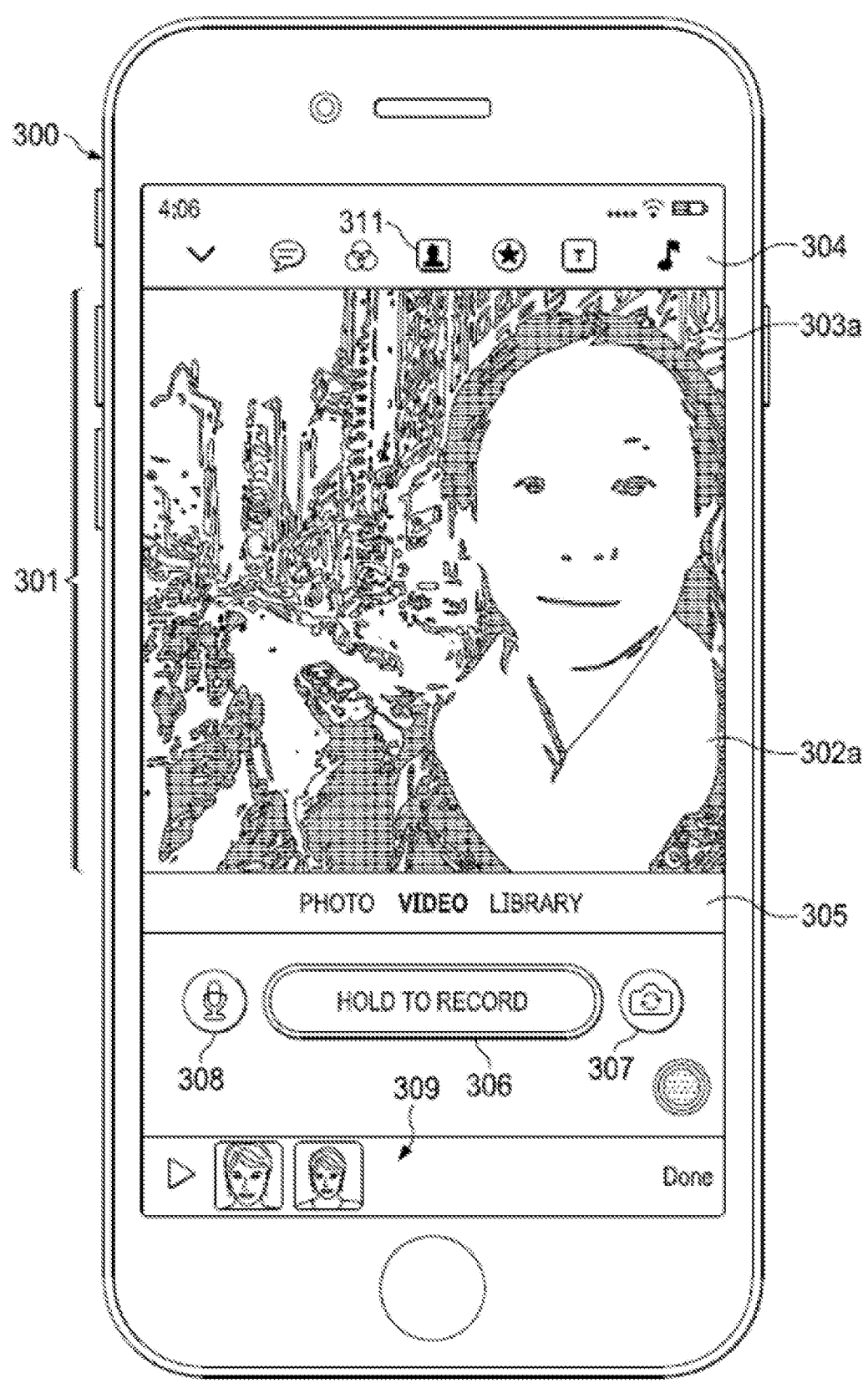
FIGS. 3A and 3B illustrate a graphical user interface for recording AR selfies using a forward-facing camera, according to an embodiment.
Figure 3B:
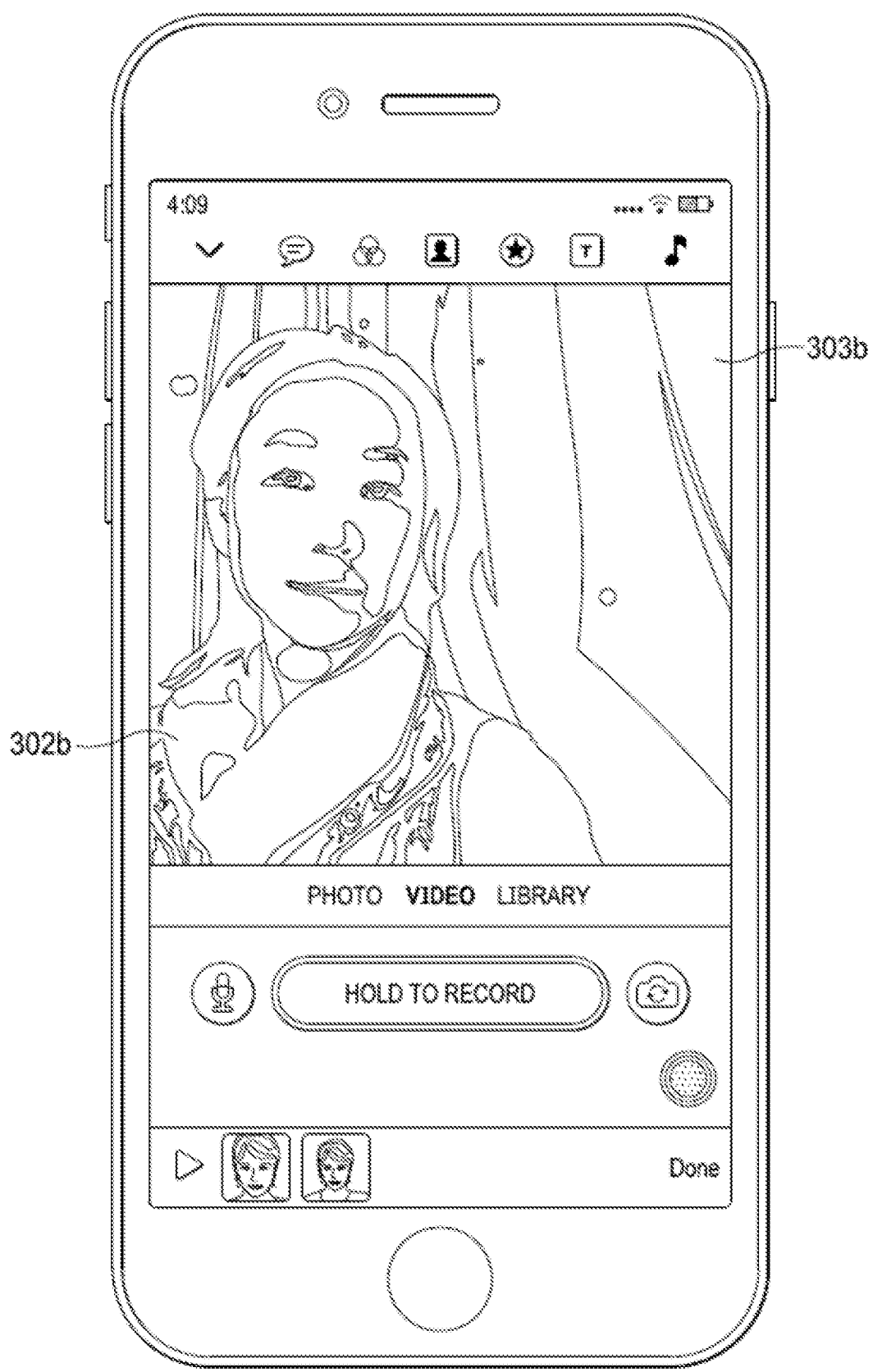

FIGS. 3A and 3B are graphical user interfaces for recording AR selfies, according to an embodiment. Referring to FIG. 3A, AR selfie GUI 300 includes viewport 301 displaying a composite video frame that includes selfie subject 302a and virtual background content 303a. A "cartoon" special effect has been applied to the composite video to create an interesting effect and to hide artifacts from the alpha compositing process. Although a single composite video frame is shown, it should be understood that viewport 301 is displaying a live video feed (e.g., 30 frames/second), and if the orientation of the real-world camera view direction changes, virtual background 303a will also seamlessly change to show a different portion of the virtual environment. This allows the user to "look around" the visual environment by changing the view direction of the real-world camera.

In an embodiment, the location of the virtual camera, in addition to its orientation, can be changed in the virtual environment. For example, the location of the virtual camera can be changed by physically moving the mobile device or by using a GUI affordance (a virtual navigation button). In the former, location data (e.g., GNSS data) and/or inertial sensor data (e.g., accelerometer data) can be used to determine the position of the virtual camera in the virtual environment. In an embodiment, the virtual environment can be 3D video, 3D 360° video or 3D computer-generated imagery (CGI) that can respond to a user's actions.

GUI 300 also includes several affordances for performing various tasks. Tab bar 304 allows the user to select a photo editing option, such as invoking AR selfie recording. Tab bar 305 allows the user to select a camera function (e.g., photo, video, panorama, and library). Tab bar 304 can be context sensitive such that the options in tab bar 304 can change based on the camera function that is selected in tab bar 305. In the example shown, the "video" option is selected in tab bar 305 and the AR selfie recording option 311 is selected in tab bar 304.

To record the AR selfie, GUI 300 includes virtual record button 306 for recording the AR selfie to local storage (e.g., flash memory). Thumbnail image tray 309 can hold thumbnail images for recorded AR selfies, which can be selected to playback the corresponding AR selfie video in viewport 301. Camera reversal button 307 allows the user to toggle between forward-facing and backward-facing cameras. Microphone enable button 308 toggles one or more microphones of mobile device 102 on and off. A done button 310 exits GUI 300.

FIG. 3B shows a different special effect applied to selfie subject 302b and a different virtual background content 303b. For example, virtual background content can be a cartoon environment with animated cartoon characters and other objects. It should be understood that any virtual background content can be used in an AR selfie. In some implementations, animated objects (e.g., animated particles such as snowflakes and sparks) can be inserted between the selfie subject and the virtual background content to create a more beautiful virtual environment, as described in reference to FIG. 5. In an embodiment, selfie subject 302b can be given an edge treatment, such as a "glow" or outline around the image or an "ink" outline. In an embodiment, animated objects can be inserted in front of selfie subjects 302a, 302b. For example, selfie subjects 302a, 302b can be surrounded by a floating text ribbon or other animated object. In an embodiment, selfie subjects 302a, 302b can be layered over an existing real-world photo or video.

Figure 3C:
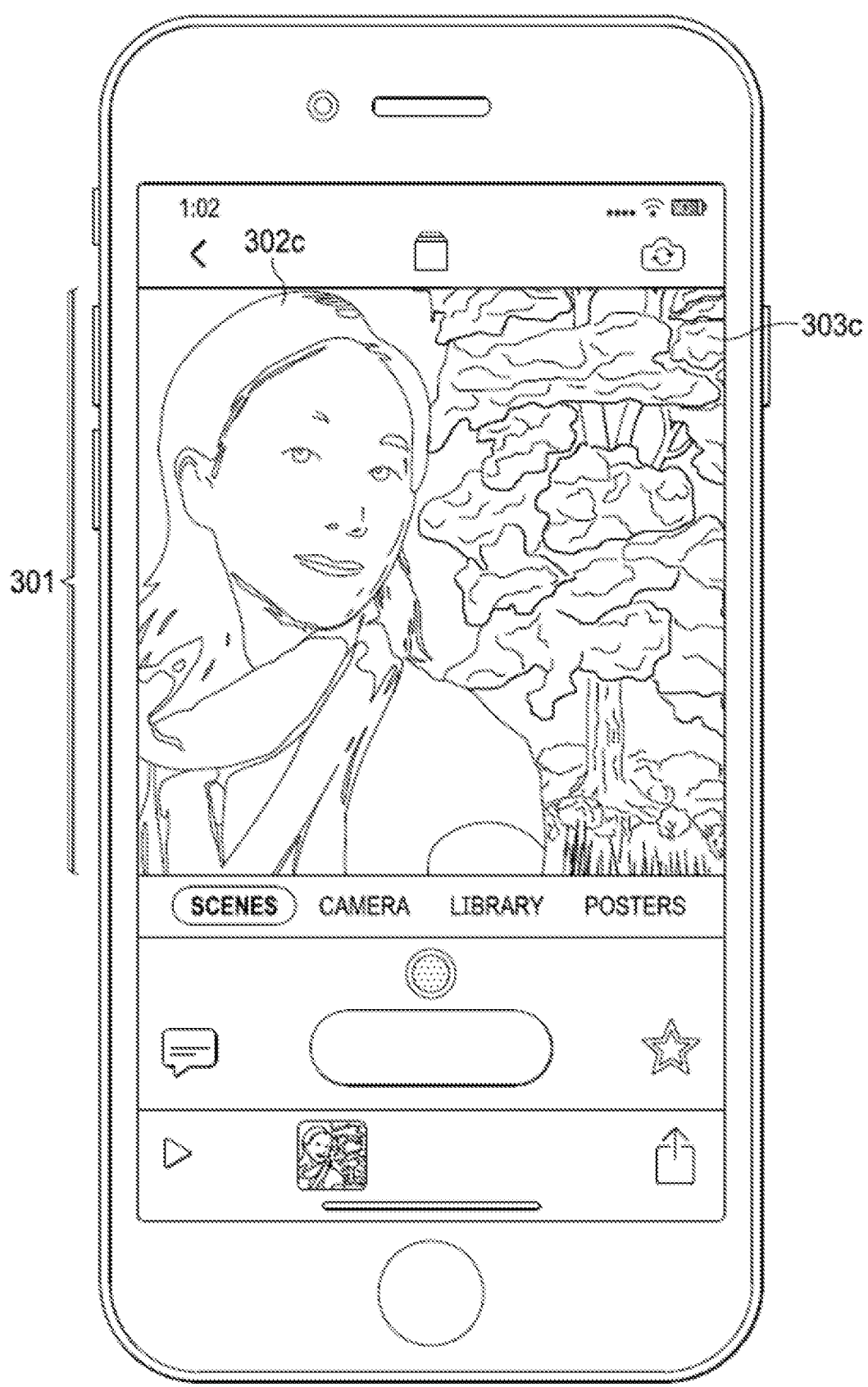
FIGS. 3C and 3D illustrate graphical user interfaces with different background scenes selected and showing a recording view and full-screen playback view, according to an embodiment.
Figure 3D:
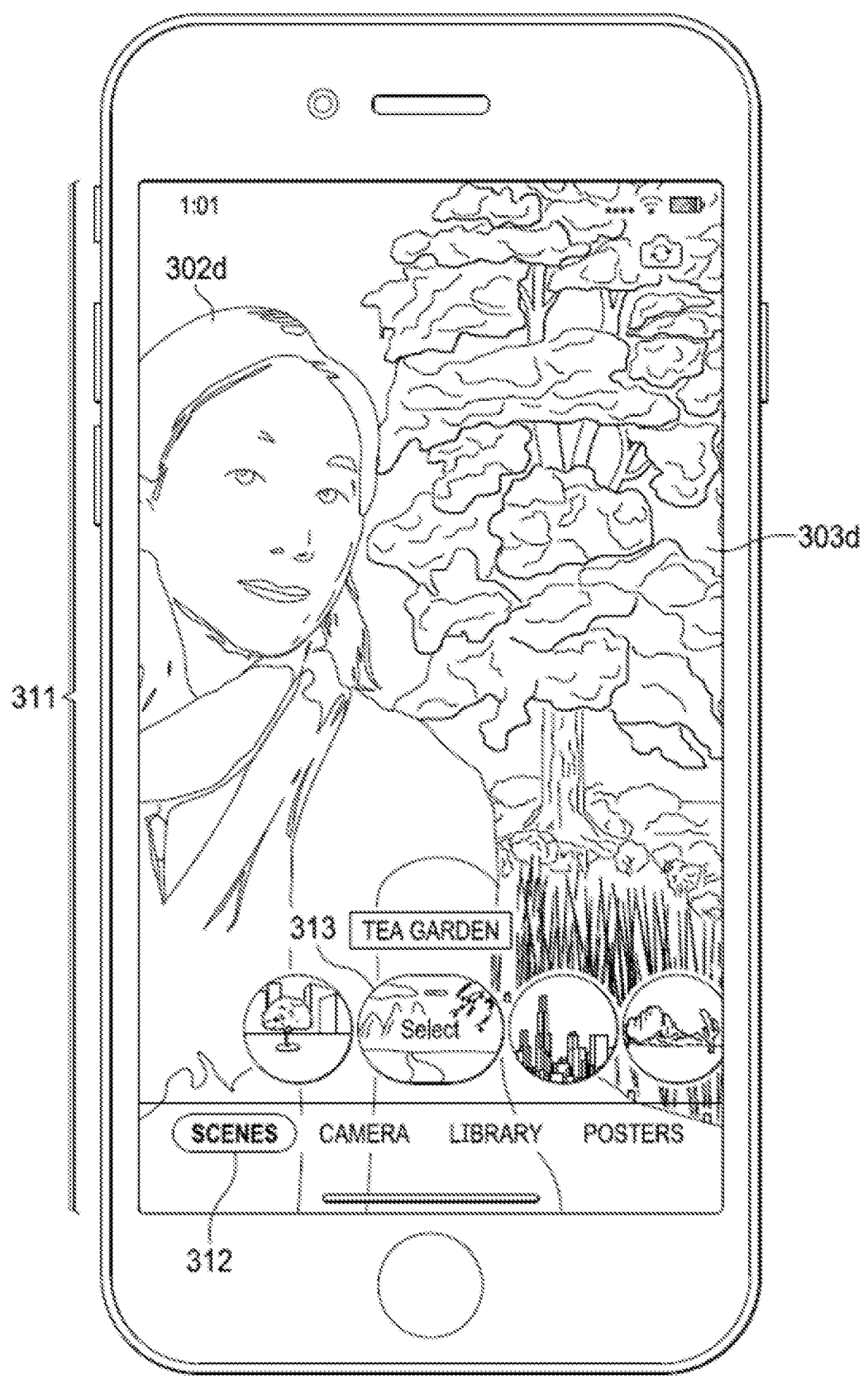

FIGS. 3C and 3D illustrate graphical user interfaces with different background scenes selected and showing a recording view and full-screen playback view, according to an embodiment. In FIG. 3C, a recording view is shown where user 302c has selected a virtual background 303c. Note that during recording, viewport 301 is not full-screen to provide room for recording controls. In FIG. 3D, a full-screen playback view includes scene selector 313 that can be displayed when user 302d has selected the "SCENES" affordance 312. In an embodiment, scene selector 313 is a touch control that can be swiped by user 302d to select virtual background 303d, which in this example is a Japanese tea garden. Also note that virtual background 303d is now displayed full-screen in viewport 311.

Figure 3E:
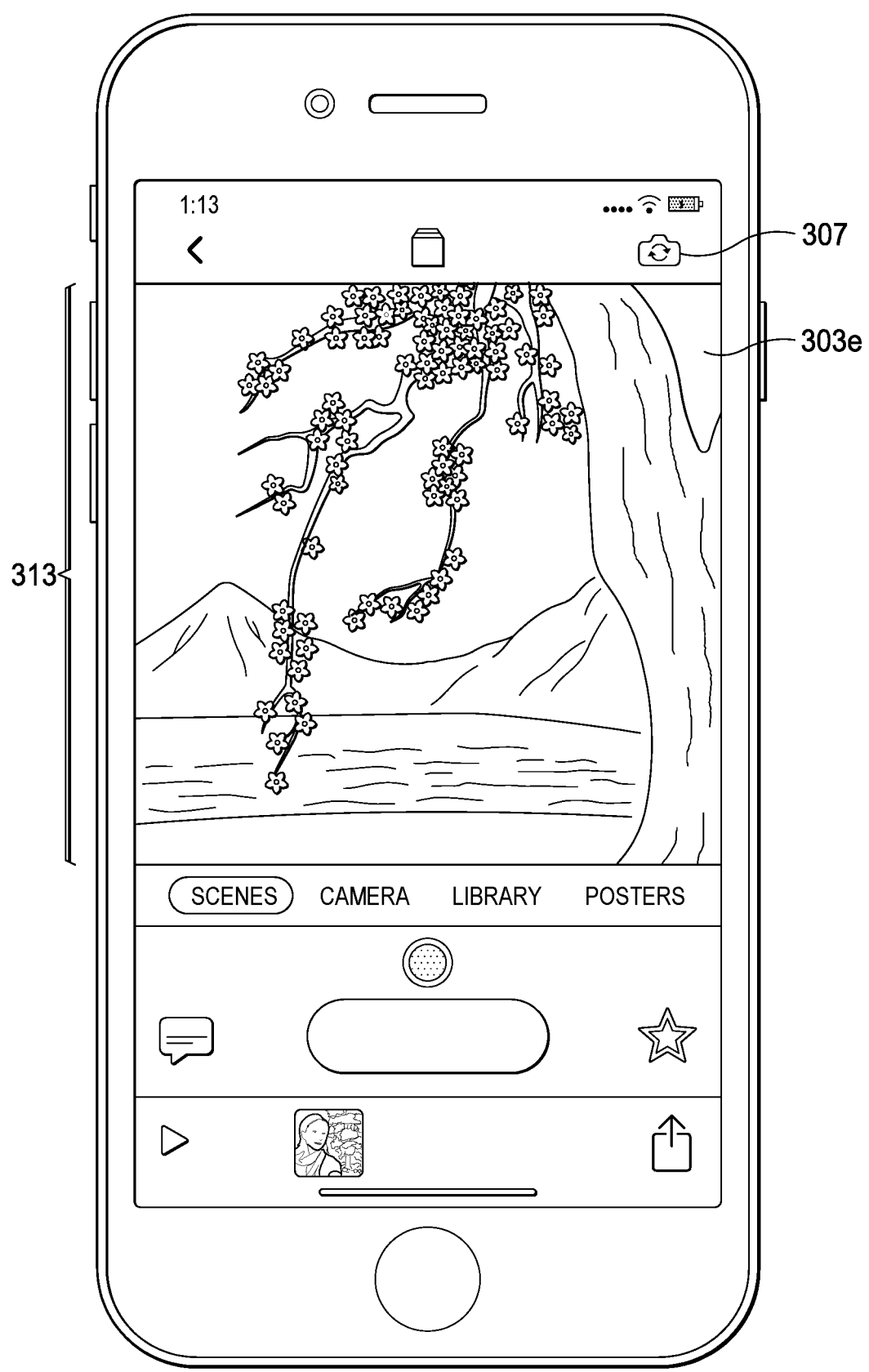
FIGS. 3E and 3F illustrate graphical user interfaces for recording and playing back selfies using a backward-facing camera and showing a recording view and full-screen playback view, according to an embodiment.
Figure 3F:
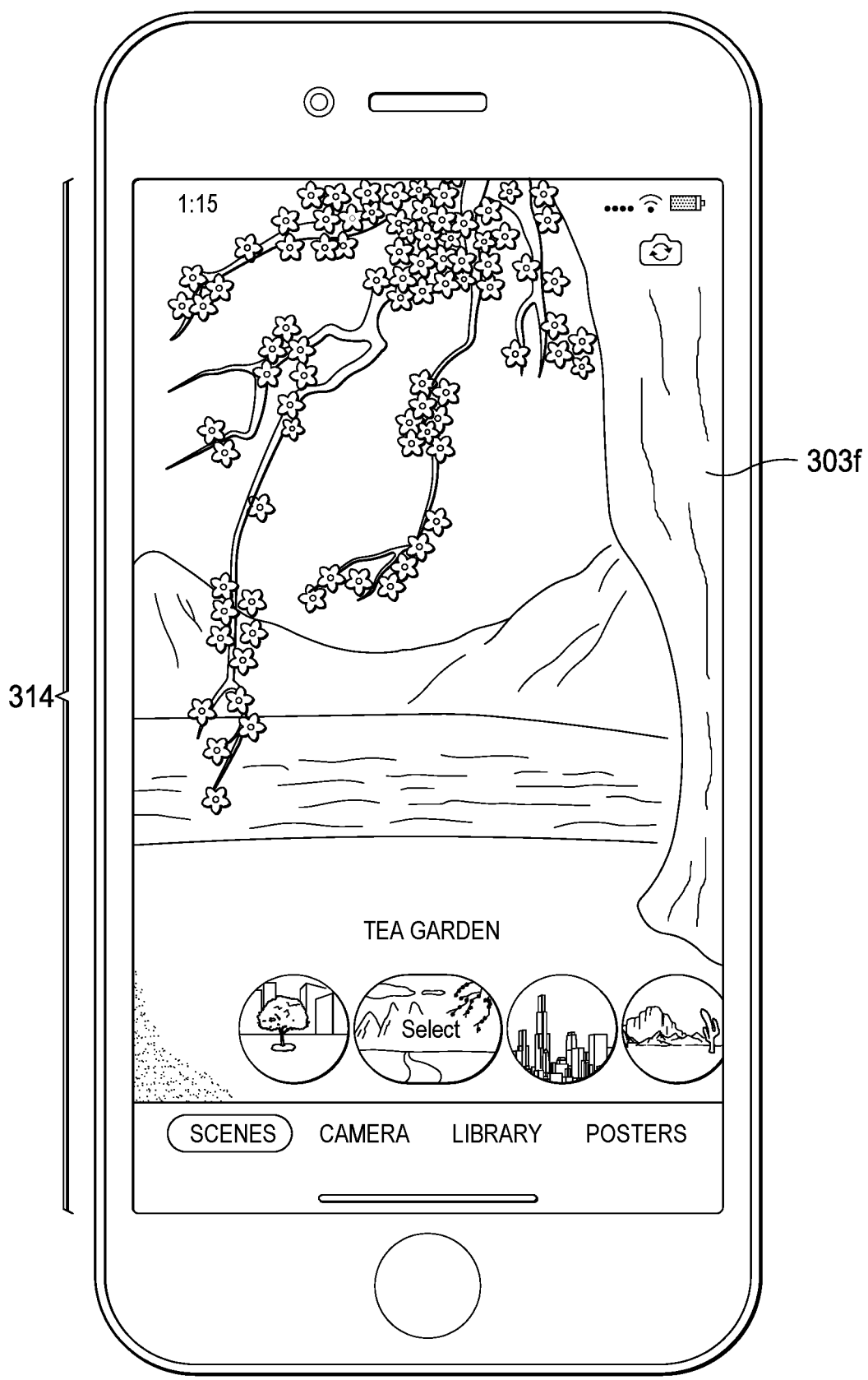

FIGS. 3E and 3F illustrate graphical user interfaces for recording and playing back selfies using a backward-facing camera and showing a recording view and full-screen playback view, according to an embodiment. In FIG. 3E, a recording view is shown with virtual background 303e. Virtual background 303e is what a user would see in front of them through the backward-facing camera in the virtual environment. Affordance 307 can be selected by the user to toggle between forward-facing and backward-facing cameras. In FIG. 3F, a full-screen playback view includes scene selector 313 that can be displaced when user 302d has selected the "SCENES" affordance 312. In an embodiment, scene selector 313 can be swiped by user 302d to select virtual background 303f, which in this example is a Japanese tea garden. Also note that virtual background 303f is now displayed full-screen in viewport 314. In an embodiment, when the user first selects a virtual environment a predefined orientation is presented in the viewport.

Example System for Generating AR Selfies

Figure 4:
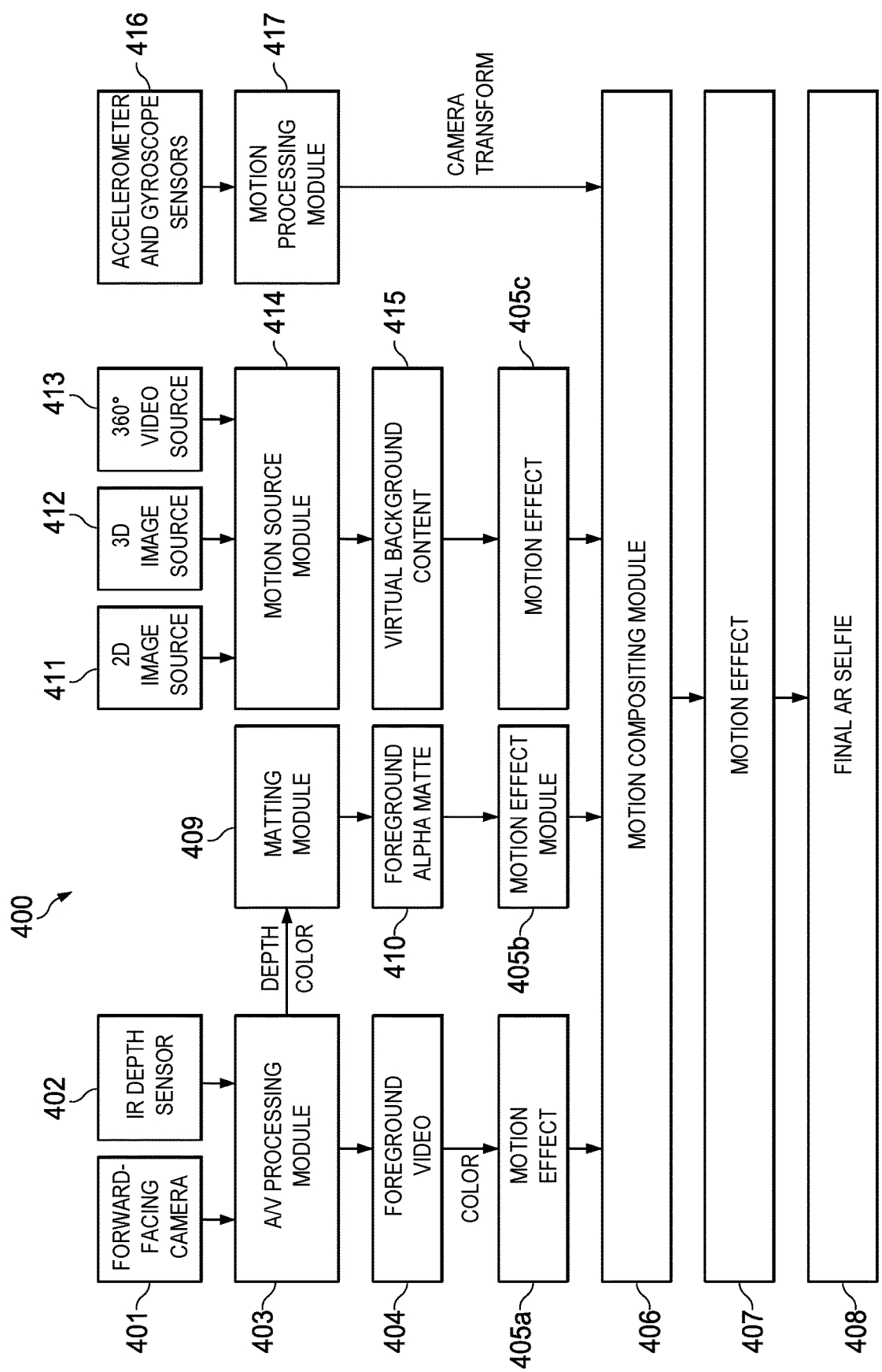
FIG. 4 is a block a diagram of a system illustrating the process steps used in the creation of an AR selfie, according to an embodiment.

FIG. 4 is a block a diagram of system 400 illustrating the processing steps used in the creation of an AR selfie, according to an embodiment. System 400 can be implemented in software and hardware. Forward-facing camera 401 generates RGB video and IR depth sensor 402 generates depth data, which are received by Audio/Visual (A/V) processing module 403. A/V processing module 403 includes software data types and interfaces to efficiently manage queues of video and depth data for distribution to other processes, such as matting module 409, which performs the processes described in reference to FIGS. 6A-6L. A/V processing module 403 also provides foreground video 404 including images of the selfie subject, which can be optionally processed with a motion effect 405a, such as the "cartoon" effect shown in FIG. 3A. Matting module 409 outputs a foreground alpha matte 410, which can be optionally processed by motion effect module 405b.

For virtual background processing, one or more of 2D image source 411, 3D image source 412 or 360° video source 413 can be used to generate virtual background content 415. In an embodiment, a 3D image source can be a rendered 3D image scene with 3D characters. These media sources can each be processed by motion source module 412, which selects the appropriate source depending the virtual environment selected by the user. Motion compositing module 406 generates composite video from foreground video 404, foreground alpha matte 410 and virtual background content 415, as described in reference to FIG. 5. Motion effect 407 (e.g., a blurring effect) can be optionally applied to the composite video output by motion compositing module 406 to generate the final AR selfie 408.

Accelerometer and gyroscope sensors 416 provide motion data that is processed by motion processing module 417 to generate a camera transform, as described in reference to FIGS. 2A-2E. During recording, live motion data from the sensors 416 is used to generate the AR selfie and is stored in a local storage device (e.g., stored in flash memory). When the AR selfie is played back, the motion data is retrieved from the local storage device. In an embodiment, in addition to virtual camera orientation, virtual camera position in the virtual environment can be provided by motion processing module 417 based on sensor data. With virtual camera and position information, the user can walk around the 3D scene with 3D characters.

Example Compositing Process

Figure 5:
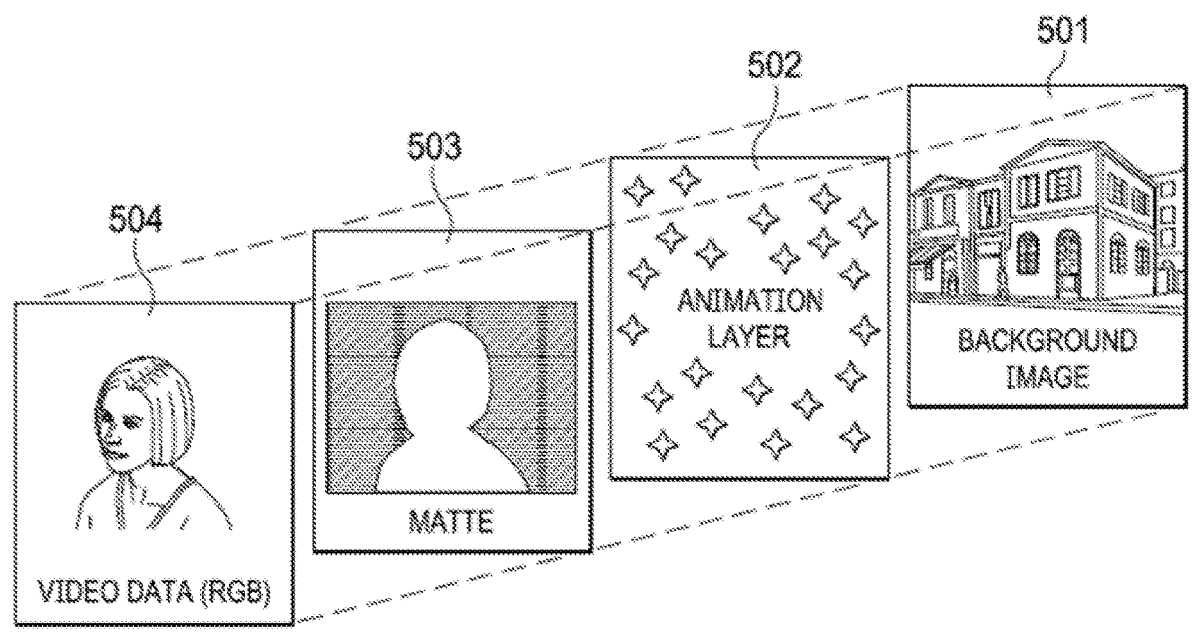
FIG. 5 illustrates compositing layers used in an AR selfie, according to an embodiment.

FIG. 5 illustrates compositing layers used in an AR selfie, according to an embodiment. In an embodiment, alpha compositing is used to combine/blend the video data containing an image of the selfie subject with the virtual background content. An RGB-Depth matte ("RGB-D matte") includes contour information for the subject projected on a binary depth matte, which is used to combine the foreground image of the subject with the virtual background content.

In the example shown, one or more animation layers 502 (only one layer is shown) is composited on background content 501. Matte 503 is composited on one or more animation layers 502 and foreground RGB video data 504, including the subject is composited on matte 503, resulting in the final composite AR selfie, which is then displayed through viewport 301 presented on a display of mobile device 102. In an embodiment, a motion effect can be applied to the composite video, such as a blurring effect to hide any artifacts resulting from the compositing process. In an embodiment, animation layers can be composited in front or back of the RGB video data 504.

Example Processes for Generating RGB-D Matte

In an embodiment, the depth sensor is an IR depth sensor. The IR depth sensor includes an IR projector and an IR camera, which can be an RGB video camera that operates in the IR spectrum. The IR projector projects a pattern of dots using IR light which falls on objects in the image scene, including the subject. The IR camera sends a video feed of a distorted dot pattern into a processor of the depth sensor and the processor calculates depth data from the displacement of the dots. On near objects the pattern of dots is dense and on far objects the pattern of dots are spread out. The depth sensor processor builds a depth image or map that can be read from by a processor of a mobile device. If the IR projector is offset from the IR camera, some of the depth data may be undefined. Typically, this undefined data is not used. In the disclosed matte generation process, however, the undefined data is used to improve segmentation and contour detection, resulting in a more seamless composite.

Figure 6A:
Figure 6B:
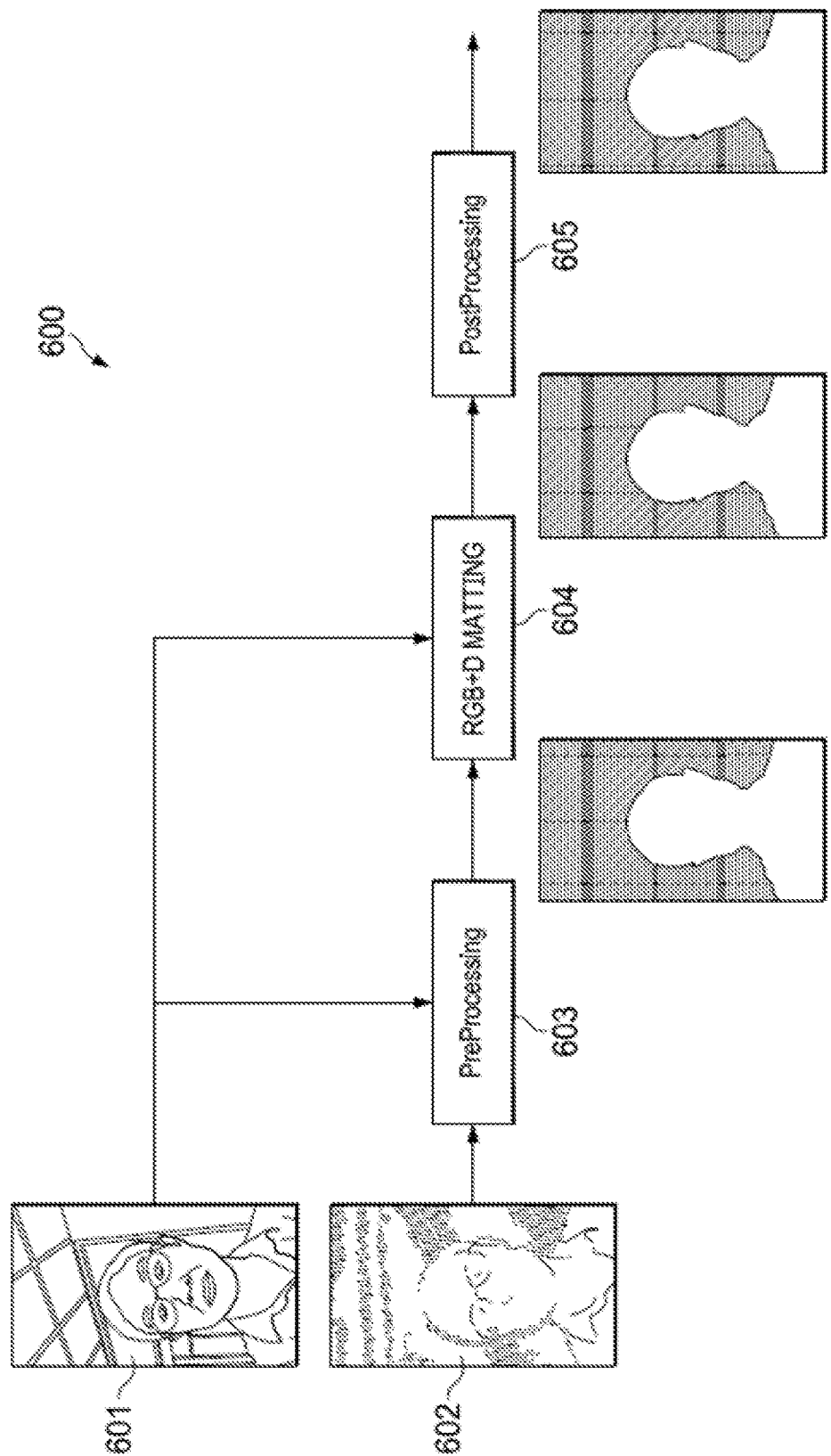

Referring to FIGS. 6A and 6B, matte generation process 600 can be divided into three stages: preprocessing stage 603, RGB-D matting stage 604 and post-processing stage 605. Process 600 takes as input RGB video data 601 that includes images of the subject and a depth map 602 that includes the depth data provided by the IR depth sensor. It should be observed that depth map 602 includes areas of shadow where the depth data is undefined. Note that the shadow along the left contour of the subject's face is thicker (more undefined data) than along the right contour of the subject's face. This is due to the offset between the IR projector and the IR camera. Each of stages 603-605 will be described in turn below.

Figure 6C:
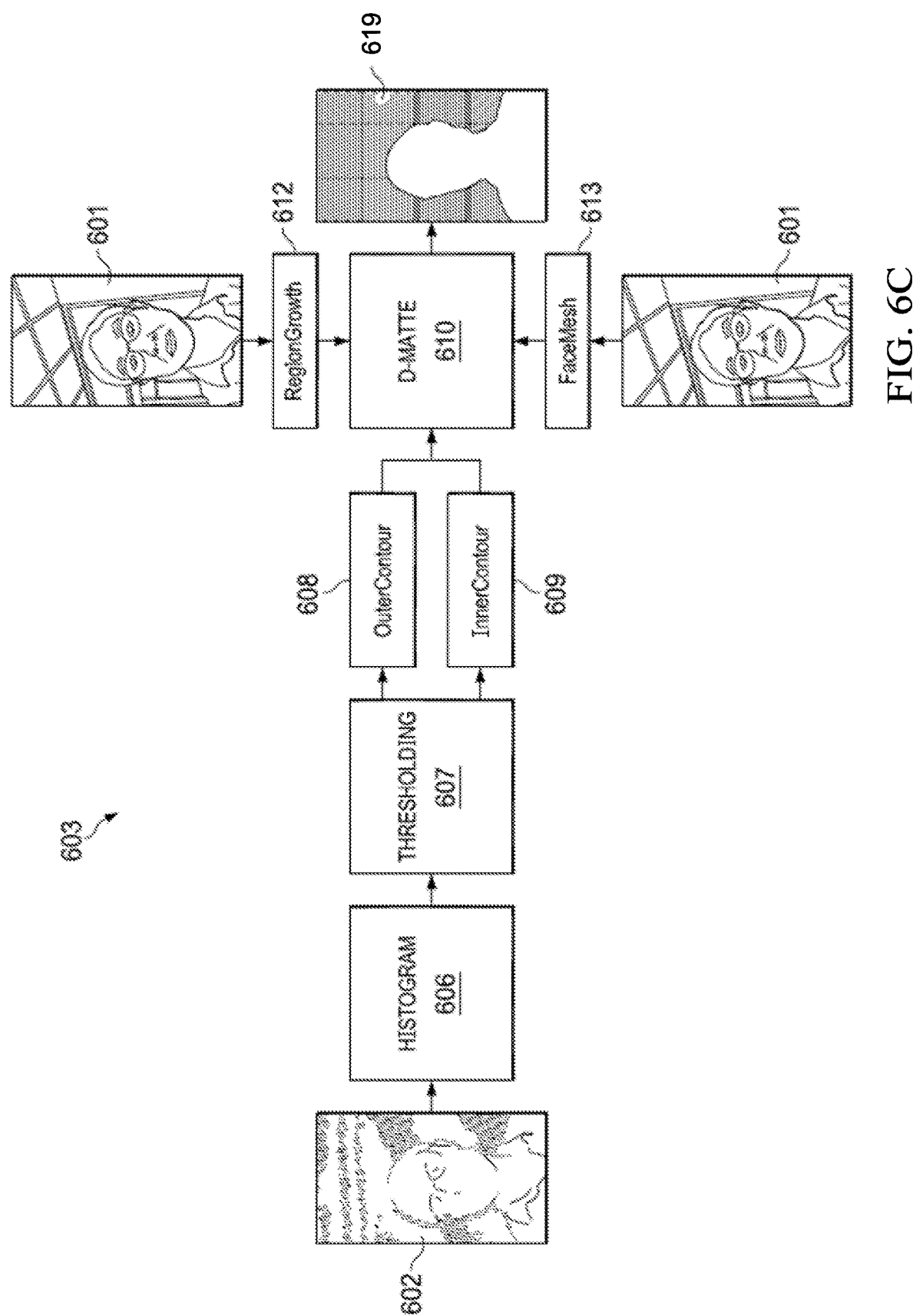

Referring to FIG. 6C, the steps of pre-processing stage 603 are shown, which include histogram generation 606, histogram thresholding 607, outer contour detection 608, inner contour detection 609 and coarse depth matte generation 610, iterative region growing 612 and a 3D face mesh modeling 613. Each of these preprocessing steps will now be described in turn.

Figure 6D:
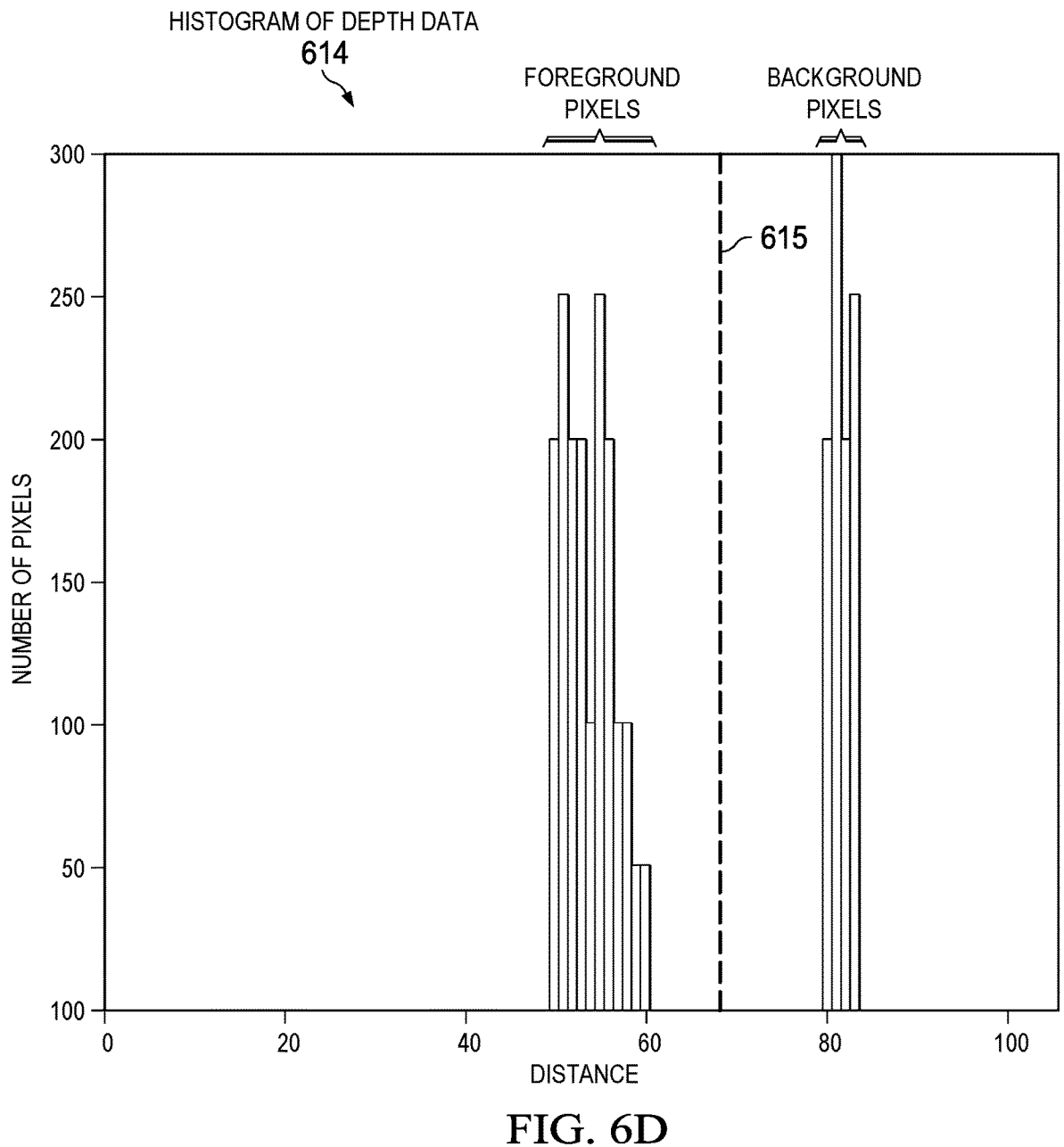

Histogram generation 606 places the depth data into bins. The histogram-thresholding step 607 is used to segment the foreground depth data from the background depth data by looking for "peaks and valleys" in the histogram. As shown in FIG. 6D, histogram 614 is generated from absolute distance data, where the vertical axis indicates the number of depth data values (hereinafter called "depth pixels") in each bin and the horizontal axis indicates the distance values provided by the depth sensor, which in this example is absolute distance. Note that in this example the distance values are in bin index multiples of 10.

It can be observed from FIG. 6D, that the foreground pixels cluster together in adjacent bins centered around 550 mm, and the background pixels cluster together in adjacent bins centered around 830 mm. Note that there could be additional clusters of distance data if an object was inserted in between the subject and the background or in front of the subject. A distance threshold can be established (shown as line 615) that can be used to segment the pixels into foreground and background pixels based on distance to create a binary depth matte. For example, each pixel that has a distance less than 700 mm is designated as foreground and assigned a binary value of 255 for white pixels in the binary depth matte (e.g., assuming an 8-bit matte), and each pixel that has a distance greater than 700 mm is designated as background and is assigned a binary value of 0 for black pixels in the binary depth matte.

Referring to FIG. 6E, threshold 615 (e.g., at about 700 mm) is applied to histogram 614 to generate two binary depth mattes 616a, 616b for finding inner and outer contours of the subject, respectively. In an embodiment, threshold 615 can be selected to be the average distance between the outer most bin of the foreground bins (the bin containing pixels with the longest distances) and the inner most bin of the background pixels (the bin containing pixels with the shortest distances).

Although the segmentation of pixels described above uses a simple histogram thresholding method, other segmentation techniques could also be used including but not limited to: balanced histogram thresholding, k-means clustering and Otsu's method.

Referring again to FIG. 6E, steps 608, 609 extract the inner and outer contours of the subject from binary depth mattes 616a, 616b, respectively. A contour detection algorithm is applied to depth mattes 616a, 616b. An example contour detection algorithm is described in Suzuki, S. and Abe, K., *Topological Structural Analysis of Digitized Binary Images by Border Following*. CVGIP 30 1, pp. 32-46 (1985).

Depth matte 616a is generated using only defined depth data and depth matte 616b is generated using defined and undefined depth data (shadow data). If depth mattes 616a, 616b were to be combined into a single depth matte, the resulting combined depth matte would be similar to trimap 704 shown in FIG. 7C, where the grey region (referred to as the "blended" region) between the inner and outer contours included undefined depth data which may include important contour detail that should be included in the foreground. After the inner and outer contours are extracted they can be smoothed using, for example, a Gaussian blur kernel. After the contours are smoothed, they are combined 618 into coarse depth matte 619, as described in reference to FIGS. 6F-6I.

Figure 6F:
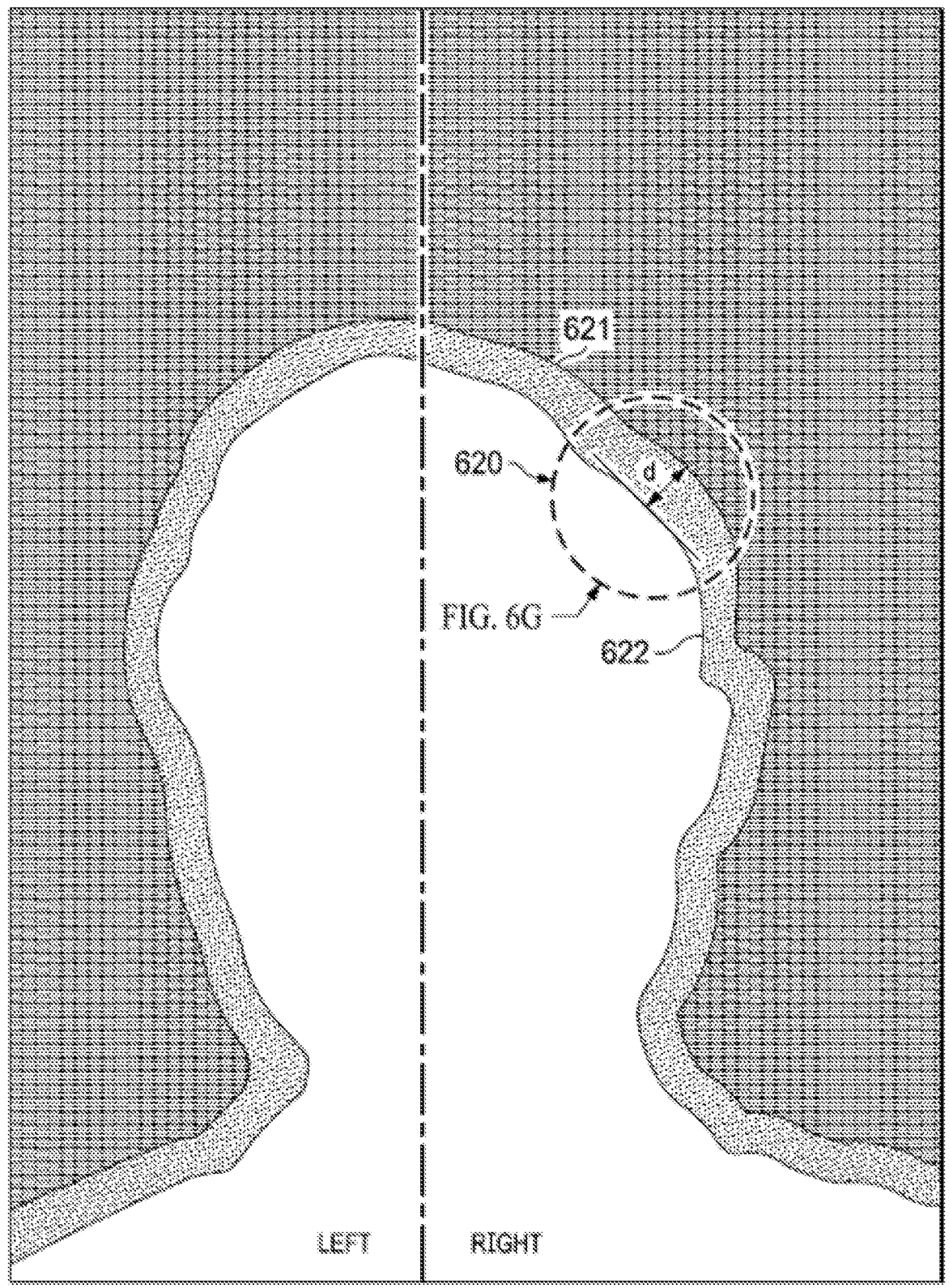

FIG. 6F illustrates the use of a distance transform to create coarse depth matte 619. Outer contour 621 and inner contour 622 bound a blended region of undefined pixels (undefined depth data) between the contours. In some instances, some of the undefined pixels may include important contour information that should be assigned to the foreground (assigned white pixels). To generate coarse depth matte 619, the subject is divided vertically into left and right hemispheres and a distance transform is performed on the undefined pixels in the blended region.

Figure 6G:
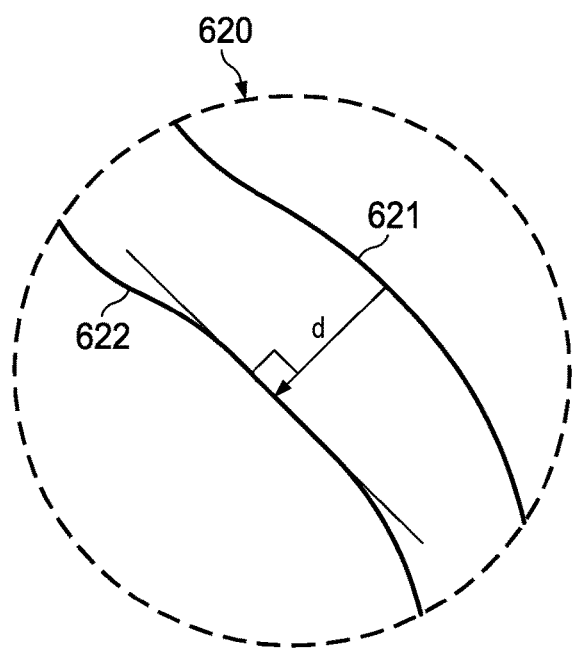
Figure 6H:
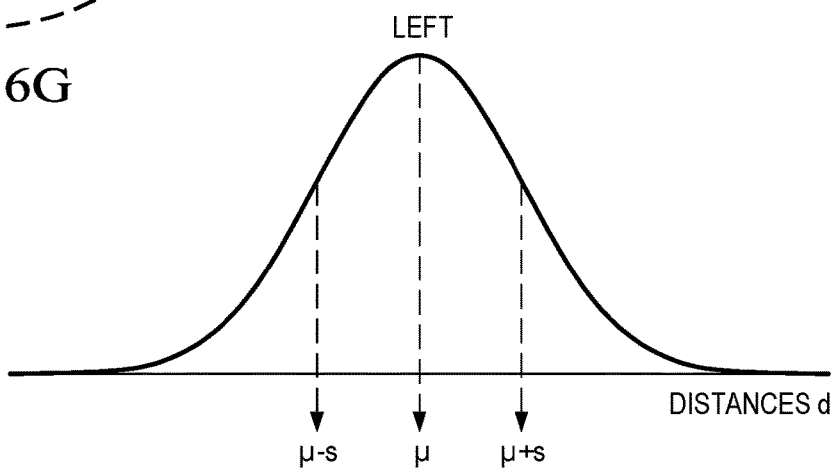
Figure 6I:
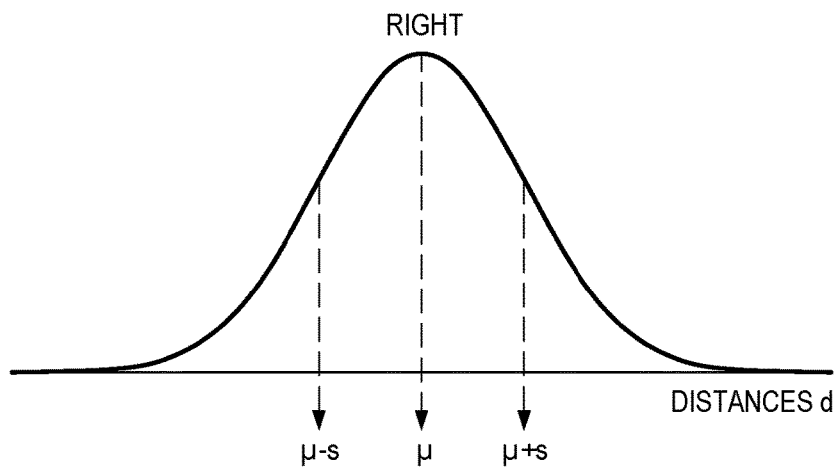
Figure 6J:
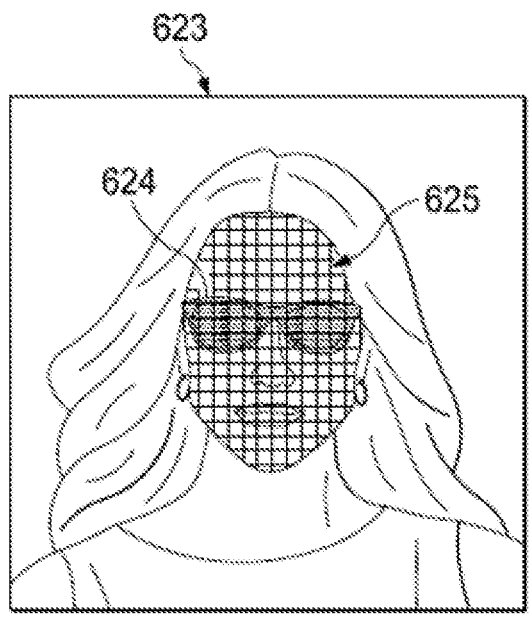
Figure 6K:
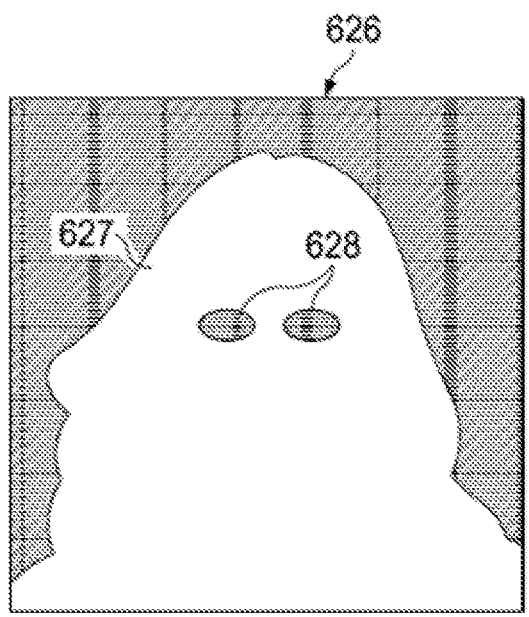
Figure 6L:
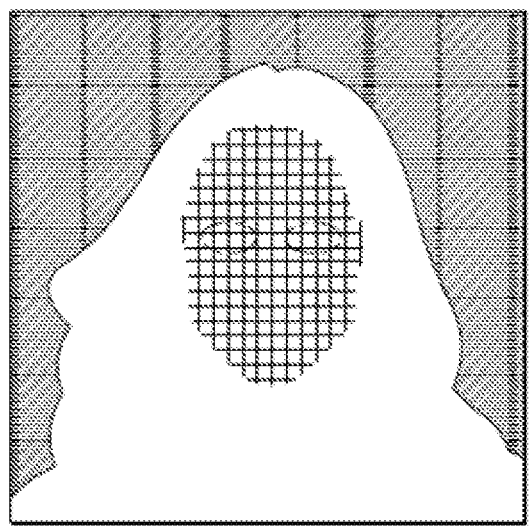

In an embodiment, perpendicular distances between pixels of inner contour 622 and outer contour 621 are calculated, as shown in FIGS. 6F and 6G. Next, probability density functions of the calculated distances are computed separately for the left and right hemispheres, as shown in FIGS. 6H and 6I. The left and right hemispheres have different probability density functions because, as noted earlier, the shadows on the left side of the subject's face are thicker than the shadows on the right side of the subject's face due to the offset between the IR projector and IR camera. In an embodiment, a Gaussian distribution model is applied to the distances to determine the mean $\mu$ and standard deviation $\sigma$ for each of the left and right hemispheres. The standard deviation $\sigma$, or a multiple of the standard deviation (e.g., $2\sigma$ or $3\sigma$), can be used as a threshold to compare against the distances in each hemisphere. The pixels in the undefined region (the grey region) in the left hemisphere are compared to the threshold for the left hemisphere. The pixels that have distances that are less than or equal to the threshold are included in the foreground and are assigned white pixel values. The pixels that have distances greater than the threshold are included in the background and are assigned black pixel values. The same process is performed for the right hemisphere. The result of the distance transform described above is coarse depth matte 619, which concludes preprocessing stage 603.

Example Region Growing/Face Mesh Processes

In some cases, the coarse matte 619 will have islands of undefined pixels in the foreground. For example, when a selfie is taken outdoors in the sunlight the performance of the IR depth sensor is degraded. In particular, if the selfie subject is wearing sunglasses, the resulting depth map will have two black holes where the eyes are located due to the sun's reflection off the sunglasses. These holes can be found in coarse depth matte 619 and filled with white pixels using an iterative region growing segmentation algorithm. In an embodiment, a histogram of foreground RGB video data 601 can be used to determine a suitable threshold value for region membership criterion.

Referring to FIGS. 6J-6L, 3D face mesh model 625 can be generated from the RGB video data 623. Face mesh model 625 can be used to identify the locations of facial landmarks on the subject's face, such as sunglasses 624. Face mesh model 625 can be overlaid on coarse depth matte 626 to identify the location of sunglasses 624. Any islands 628 of undefined pixels in foreground region 627 that are identified by face mesh model 625 are filled-in with white pixels so that the pixels are included in foreground region 627.

Figure 7A:
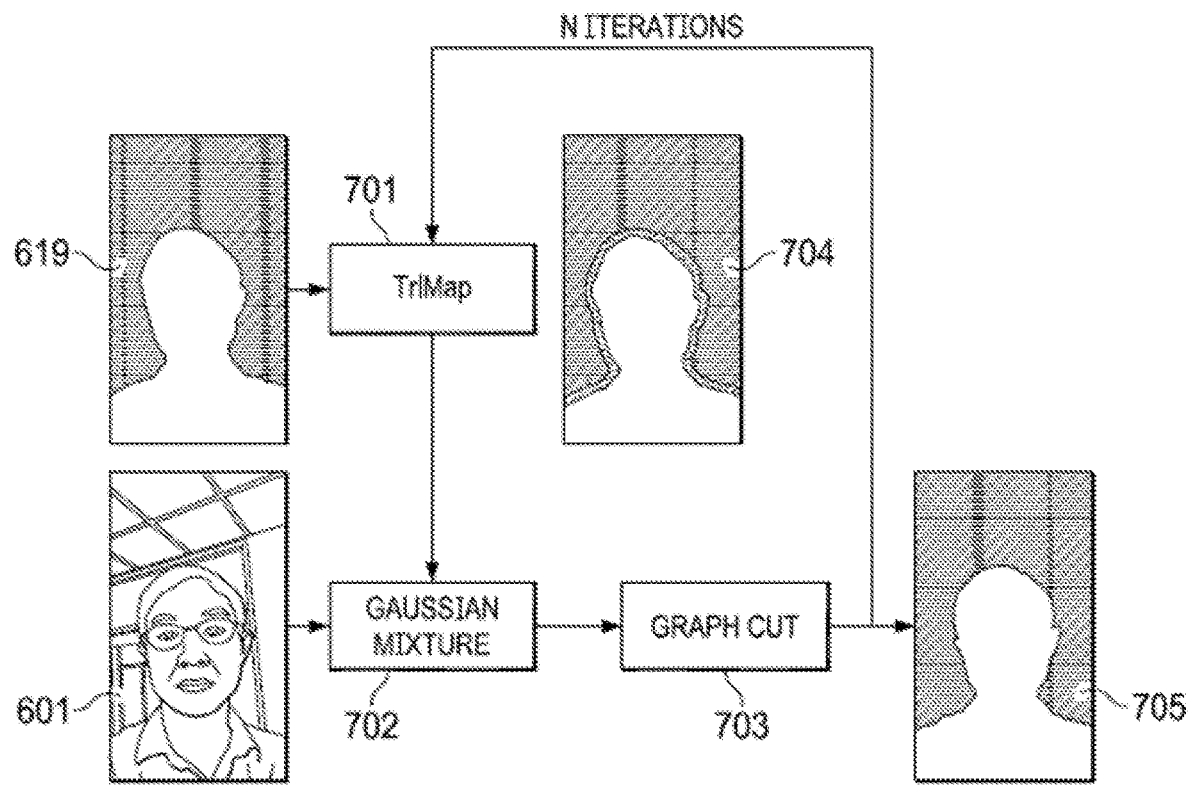
Figure 7B:
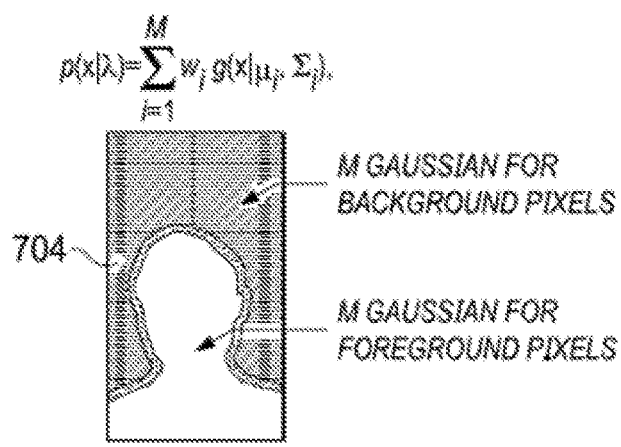

FIGS. 7A and 7B illustrate a process for RGB-D matting using a combination of RGB video data and the preprocessed depth matte 619, according to an embodiment. Referring to FIG. 7A, trimap module 701 generates trimap 704 from coarse depth matte 619. In an embodiment, trimap module 704 uses the same segmentation process used to generate trimap 704 as used to generate coarse depth matte 619 or some other known segmentation technique (e.g., k-means clustering). Trimap 704 has three regions: a foreground region, a background region and a blended region. Trimap 704 is input into Gaussian Mixture Model (GMM) 702, together with the RGB video data 601. GMM 702 models the foreground and background regions (See FIG. 7B) by a probability density function approximated by a mixture of Gaussians, as shown in Equation [3]:

$$p(x|\lambda)=\Sigma_{i=1}^{M}\omega_i g(x|\mu_i,\Sigma_i).$$ [3]

The probability density function is used by graph cuts module 703 to perform segmentation using an iterative graph cuts algorithm. An example graph cuts algorithm is described in D. M. Greig, B. T. Porteous and A. H. Seheult (1989), *Exact maximum a posteriori estimation for binary images*, Journal of the Royal Statistical Society Series B, 51, 271-279. The refined depth matte 705 output by graph cut module 703 is fed back into trimap module 701, and the process continues for N iterations or until convergence.

FIG. 7C shows the results of the previous two stages of matte generation process 600. A depth map 602 is preprocessed into binary depth mattes 616a, 616b, where depth matte 616a was generated using only defined depth data and depth matte 616b was generated using both defined and undefined depth data. Binary depth mattes 616a, 616b are then combined using a distance transform into coarse depth matte 619. Coarse depth matte 619 is input to an RGB-D matting process 604 that uses an iterative graph cuts algorithm and a GMM to model foreground and background regions of the trimap 704. The result of RGB-D matting process 604 is refined matte 705.

Figure 8:
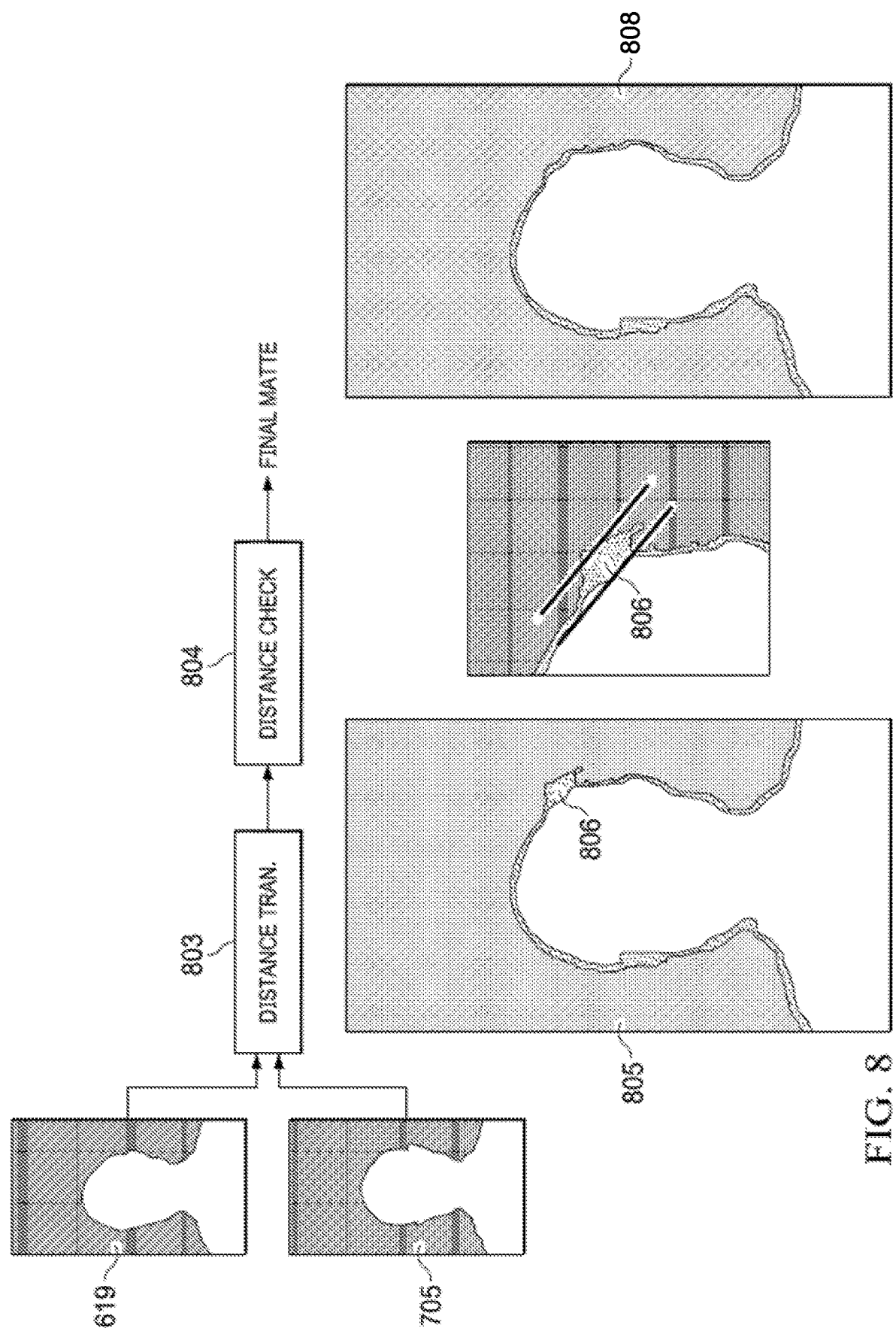
FIG. 8 illustrates a post-processing stage to remove artifacts from the refined matte, according to an embodiment.

FIG. 8 illustrates post-processing stage 605 to remove artifacts added by the refinement process, according to an embodiment. In post-processing stage 605, distance transform module 803 calculates distances between the contours in coarse depth matte 619 and refined matte 705 using the same techniques as described in reference to FIGS. 6F-6I. The distances are then compared to a threshold by distance check module 804. Any undefined pixels that are farther than a threshold from the inner contour are deemed artifacts and assigned to the background region. In the example shown, depth matte 805 includes artifact 806 before post-processing. The end result of post-processing stage 606 is the final AR selfie matte 808 used for compositing the AR selfie, as described with reference to FIG. 5. Note that artifact 806 has be removed from AR selfie matte 808 due to the post-processing described above.

Example Processes

Figures 9, 10:
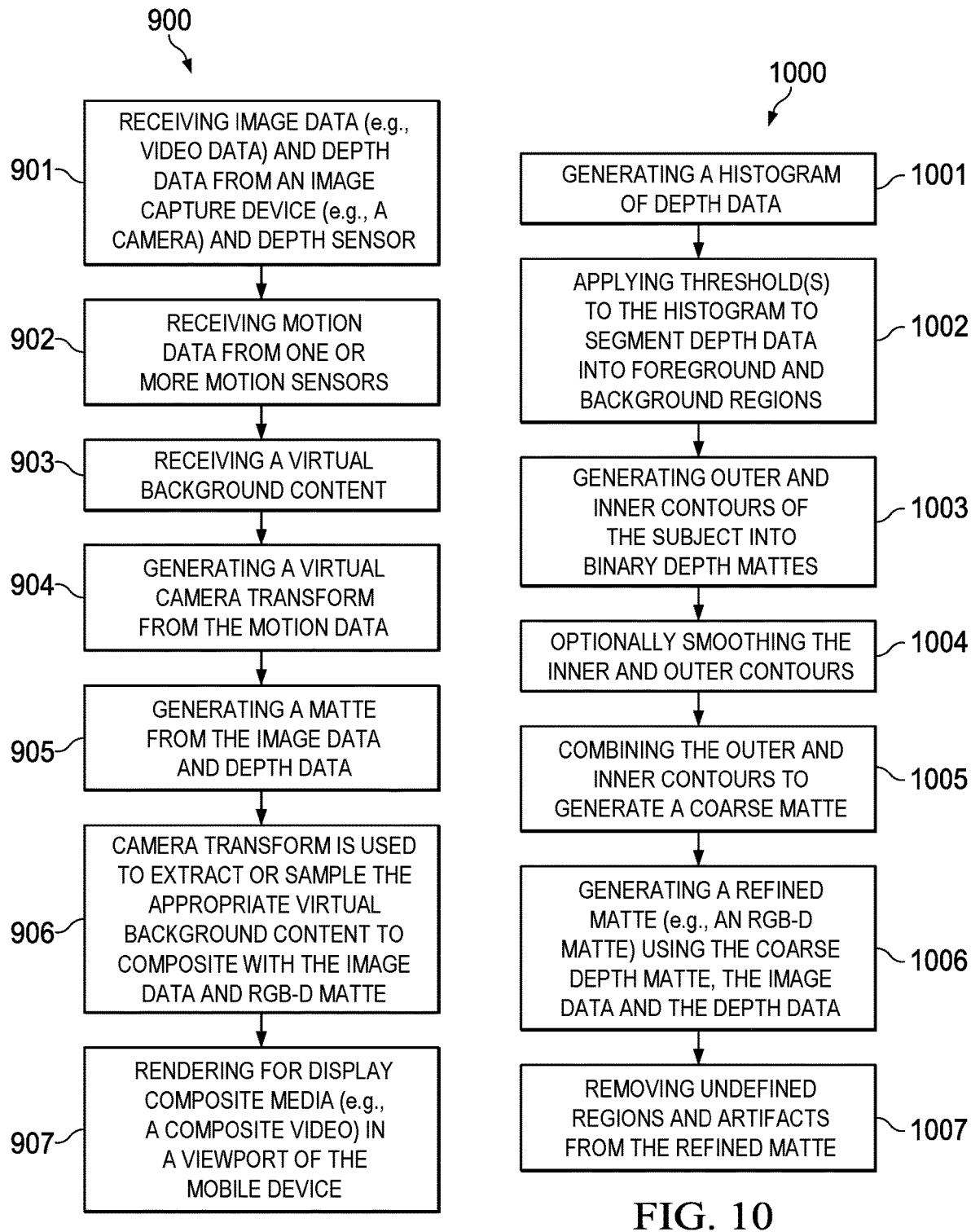
FIG. 9 is a flow diagram of a process for generating an AR selfie, according to an embodiment.
FIG. 10 is a flow diagram of a process for generating an AR selfie matte, according to an embodiment.

FIG. 9 is a flow diagram of process 900 for generating an AR selfie, according to an embodiment. Process 900 can be implemented using, for example, the device architecture described in reference to FIG. 13.

Process 900 can begin by receiving image data (e.g., video data) and depth data from an image capture device (e.g., a camera) and depth sensor (901), respectively. For example, the image data can be Red Green Blue (RGB) video data provided by an RGB video camera that includes an image of the subject. The depth sensor can be an IR depth sensor that provides a depth map that can be used to generate an RGB-Depth ("RGB-D") matte, as described in reference to FIG. 10.

Process 900 continues by receiving motion data from one or more motion sensors (902). For example, motion data can be acceleration data and orientation data (e.g., angular rate data) provided by an accelerometer and gyroscope, respectively. The motion data can be provided in the form of a coordinate transform (e.g., a body-fixed quaternion). The coordinate transform describes the orientation of the camera's view direction in a real-world reference coordinate system, which can be transformed into a virtual world reference coordinate system using a camera transform.

Process 900 continues by receiving a virtual background content (903) from storage. For example, the virtual background content can be a 2D image, 3D image or 360° video. The virtual background content can be selected by the user through a GUI. The virtual background content can be extracted or sampled from any desired virtual environment, such as a famous city or cartoon environment with animated cartoon characters and objects.

Process 900 continues by generating a virtual camera transform from the motion data (904).

Process 900 continues by generating a matte from the image data and depth data (905). For example, an RGB-D matte can be generated as described in reference to FIGS. 6I-6L. The RGB-D matte includes contour information for the subject and is use to compositing the RGB video with the virtual background content.

Process 900 can continue by compositing the image data, the RGB-D matte and the virtual background content (905), as described in reference to FIG. 5. During this step, the camera transform is used to extract or sample the appropriate virtual background content to composite with the image data and RGB-D matte (906). In an embodiment, one or more animation layers are also composited to provide, for example, animated particles (e.g., snowflakes, sparks, and fireflies). In an embodiment, the camera transform is adjusted to account for camera flip caused by the user flipping between a forward-facing camera and a backward-facing camera and vice-versa, as described in reference to FIG. 3A.

Process 900 can continue by rendering for display composite media (e.g., a composite video) in a viewport of the mobile device (907). During a recording operation, the composite media is presented as a live video feed. When the user changes the view direction of the real-world camera, the virtual camera transform updates in real-time the virtual background content in sync with the real-world camera. The recorded AR selfie video can be played back from storage through the viewport and also shared with others on, for example, on social networks.

FIG. 10 is a flow diagram of process 1000 for generating an AR selfie matte, according to an embodiment. Process 1000 can be implemented using, for example, the device architecture described in reference to FIG. 13.

Process 1000 can begin by generating a histogram of depth data (1001) and applying threshold(s) to the histogram to segment depth data into foreground and background regions (1002).

Process 1000 continues by generating outer and inner contours of the subject into binary depth mattes (1003). For example, an inner contour can be generated in a first binary depth matte using a contour detection algorithm and defined depth data only, and the outer contour can be generated in a second binary depth matte using the contour detection algorithm and depth data that includes both defined and undefined depth data.

Process 1000 continues by optionally smoothing the inner and outer contours (1004). For example, the inner and outer contours can be smoothed using a Gaussian blur kernel.

Process 1000 continues by combining the outer and inner contours to generate a coarse matte (1005). For example, a distance transform using a Gaussian distribution can be used to combine the first and second binary depth mattes into a combined coarse matte.

Process 1000 can continue by generating a refined matte (e.g., an RGB-D matte) using the coarse depth matte, the image data and the depth data (1006). For example, an iterative graphic cuts algorithm can be used on a trimap generated from the coarse matte and a GMM to generate the RGB-D matte.

Process 1000 can continue by removing undefined regions and artifacts from the refined matte (1007). For example, islands of undefined pixels in the foreground region of the RGB-D matte due to sunglasses reflecting sunlight can be identified and filled with white foreground pixels using an iterative region growing algorithm and/or a 3D face mesh model, as described in reference to FIGS. 6J-6L.

Neural Network Matte Processing

In an embodiment, it is desirable to use a neural network, such as a deep image matting neural network (NN), to generate a low-resolution matte. In some use cases, however, the low-resolution matte output by the neural network includes undesirable artifacts. For example, if there is a background image behind the user that has high-contrast edges (e.g., the corner or lines of a room or building), the high-contrast edges may be included as part of the foreground. This can result in the appearance of artifacts (e.g., "arrows") sticking to the head of the user. In another example, if the user is wearing a light-colored shirt (e.g., a white shirt) and is waving his hands in front of the shirt, the shirt may not be included in the foreground, resulting in the appearance of the user's head floating in midair. To address these use cases, the low-resolution matte output by the neural network is refined, as described in reference to FIGS. 11A, 11B and 12.

Figure 11A:
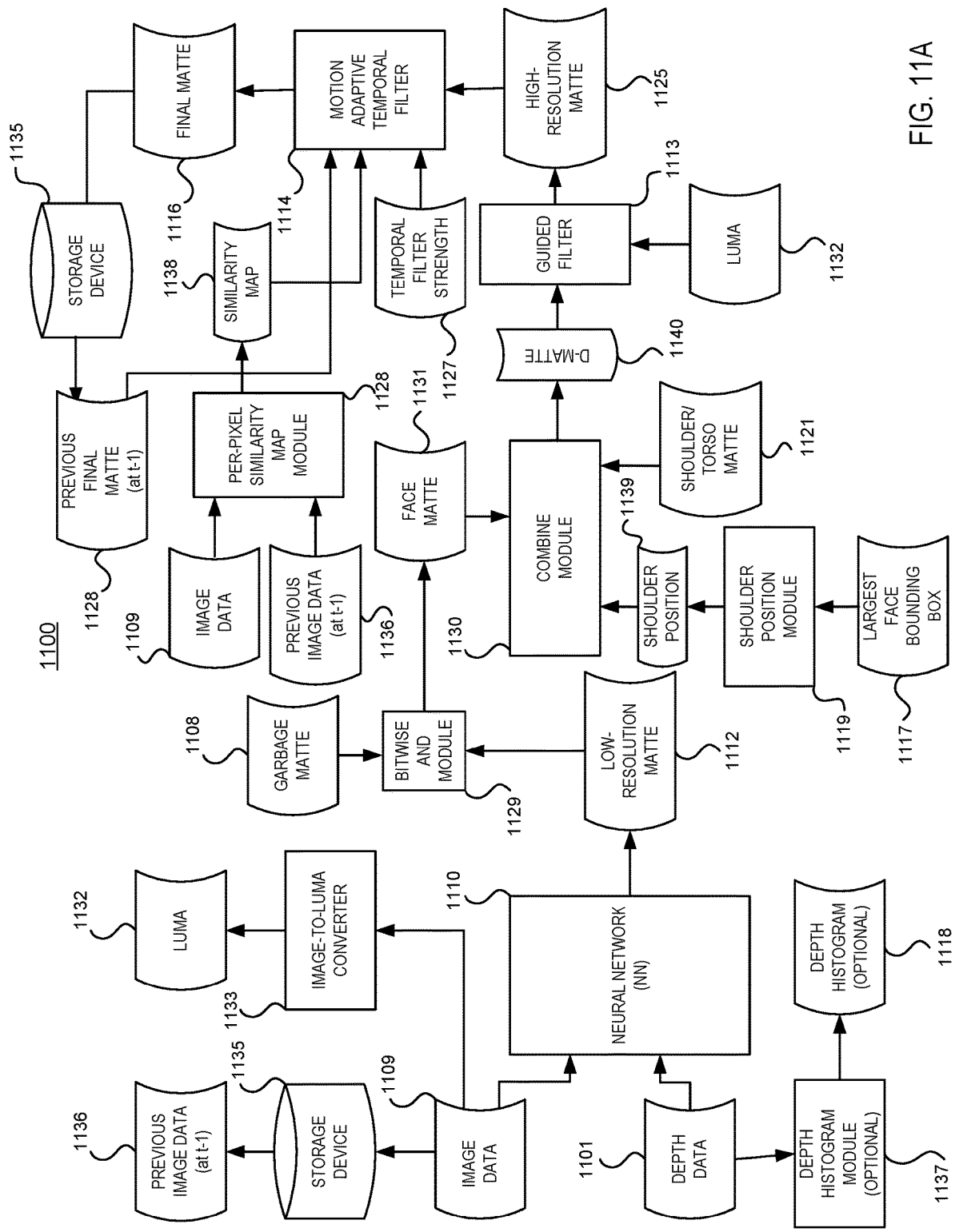
FIGS. 11A and 11B collectively are a conceptual block diagram of a system for generating an AR selfie matte using machine learning, according to an embodiment.

FIG. 11A is a conceptual block diagram of system 1100 for generating an AR selfie matte using machine learning, according to an embodiment. NN 1110 receives input image data 1109 (e.g., RGB data, YCbCr data) from an image sensor (e.g., a video camera) and optionally depth data 1101 from a depth sensor, and outputs a low-resolution matte 1112 that includes false foreground errors at high-contrast image edges. In an embodiment, NN 1110 is a convolutional neural network (CNN) that performs image segmentation. Low-resolution matte 1112 and garbage matte 1108 are input into bitwise AND module 1129, which outputs face matte 1131 for the face of the user. The generation of garbage matte 1108 is described in reference to FIG. 11B.

Face matte 1131 (containing the matte for the entire scene), shoulder position 1139 (user's shoulder level in user image) and shoulder/torso matte 1121 (portion of user image below shoulder position 1139) are input into combine module 1130. Shoulder position module 1119 determines shoulder position 1139 from the largest face bounding box 1117 (x, y, width, height). Largest face bounding box 1117 is generated using a face detection algorithm with image data 1109 and/or depth data 1101 as input, where x and y are the position coordinates of largest face bounding box 1117, and the width and height are the dimensions of largest face bounding box 1117. In an AR selfie, there can be more than one face detected, so the largest face bounding box 1117 containing the largest face in image data 1109 is used by shoulder position module 1119 to determine shoulder position 1139.

Combine module 1130 uses shoulder/torso matte 1121, as determined by largest face bounding box 1117 and the user's face orientation, to fix the light-colored shirt disappearance problem. In an embodiment, combine module 1130 takes the logical OR of shoulder/torso matte 1121 and face matte 1131 below shoulder position 1139, where the logical OR approximates a maximum operation. In an alternative embodiment, it is possible to reduce the number of processing steps by only calculating shoulder/torso matte 1121 below the shoulders and face matte 1131 above the shoulders, since largest face bounding box 1117 is known at the beginning of the entire per-frame matte generation process.

The output of combine module 1130 is denoised (refined) matte 1140 ("D-MATTE"). Denoised matte 1140 and luma image 1132 are input into guided filter 1113. Luma image 1132 is generated by image-to-luma converter 1133. Luma image 1132 represents the brightness of image data 1109 (e.g., black and white or achromatic portion of image data 1109). In an embodiment, image-to-luma converter 1133 generates luma image 1132 as a weighted sum of gamma-compressed RGB components of image data 1109, where the gamma-compression is a nonlinear operation that encodes/decodes luminance or tristimulus values in image data 1109.

Guided filter 1113 performs up-sampling on the output of combine module 1139 to generate high-resolution matte 1125. Guided filter 1113 also performs edge-preserving smoothing on the output of combine module 1139 using luma image 1132 as a "guidance image" to influence the filtering. In an embodiment, guided filter 1113 performs neighborhood operations that take into account the statistics of a region in a corresponding spatial neighborhood in luma image 1132 when calculating the value of an output pixel. In another embodiment, guided filter 1113 is replaced by a cross-bilateral filter or a variant line an orientation-aligned cross-bilateral filter.

High-resolution matte 1125 is input to motion adaptive temporal filter 1114, together with previous final matte 1128 (generated at t−1) retrieved from storage device 1135 (e.g., flash memory, disc) and a similarity map 1138 output from per-pixel similarity map module 1128. Per-pixel similarity map module 1128 takes as input image data 1109 (generated at time t) and previous image data 1136 (generated at t−1) and outputs similarity map 1138. Motion adaptive temporal filter 1114 outputs final matte 1116. As used herein "t" refers to the current frame and "t−1" refers to the previous frame of the image data 1109 or final matte 1116.

In an embodiment, similarity map 1138 is 1.0 (scaled to 8-bit) in all pixels where the two images are the same, and closer to zero the more different the image pixels are. Per-pixel similarity module 1128 calculates the negative of the square of the Euclidean distance between the RGB colors of two collocated pixels in frames t−1 and then uses that value as the argument to an exponential function.

An example pseudocode for the per-pixel similarity map module 1128 is shown below, where the input image and previous input image are assumed to have the same width and height in pixels:

```
//Pseudo Code//
For y = 1 to height of current input image {
  For x = 1 to width of previous input image {
    i = (y-1) * matte width + (x-1)
    C[i] = input image at pixel position i
    P[i] = previous input image at pixel position i
    similarity [i] = exp(-distance_squared(C[i].rgb, P[i].rgb);
  }
}
```

In an embodiment, motion adaptive temporal filter 1114 is a linear weighted average of two frames (with the weights calculated per-pixel dependent on pixel similarity). For example, the temporal filter 1114 can be implemented using the filtered( ) function given by:

filtered(source[$t$],filtered[$t$−1],weights[$t$])= weights*source[$t$]+(1-weights[$t$])*filtered[$t$−1]), where the function parameters source [t], filtered [t−1] are output from per-pixel similarity map module 1128 and the parameter weights [t] are determined by temporal strength 1127. The filtered( ) function is an exponential moving average of source.

The output of motion adaptive temporal filter 1114 is final matte 1116 (generated at time t). Final matte 1116 is stored in storage device 1135 for use by per-pixel similarity map module 1128 in a next frame.

Generating Garbage and Shoulder/Torso Mattes

Figure 11B:
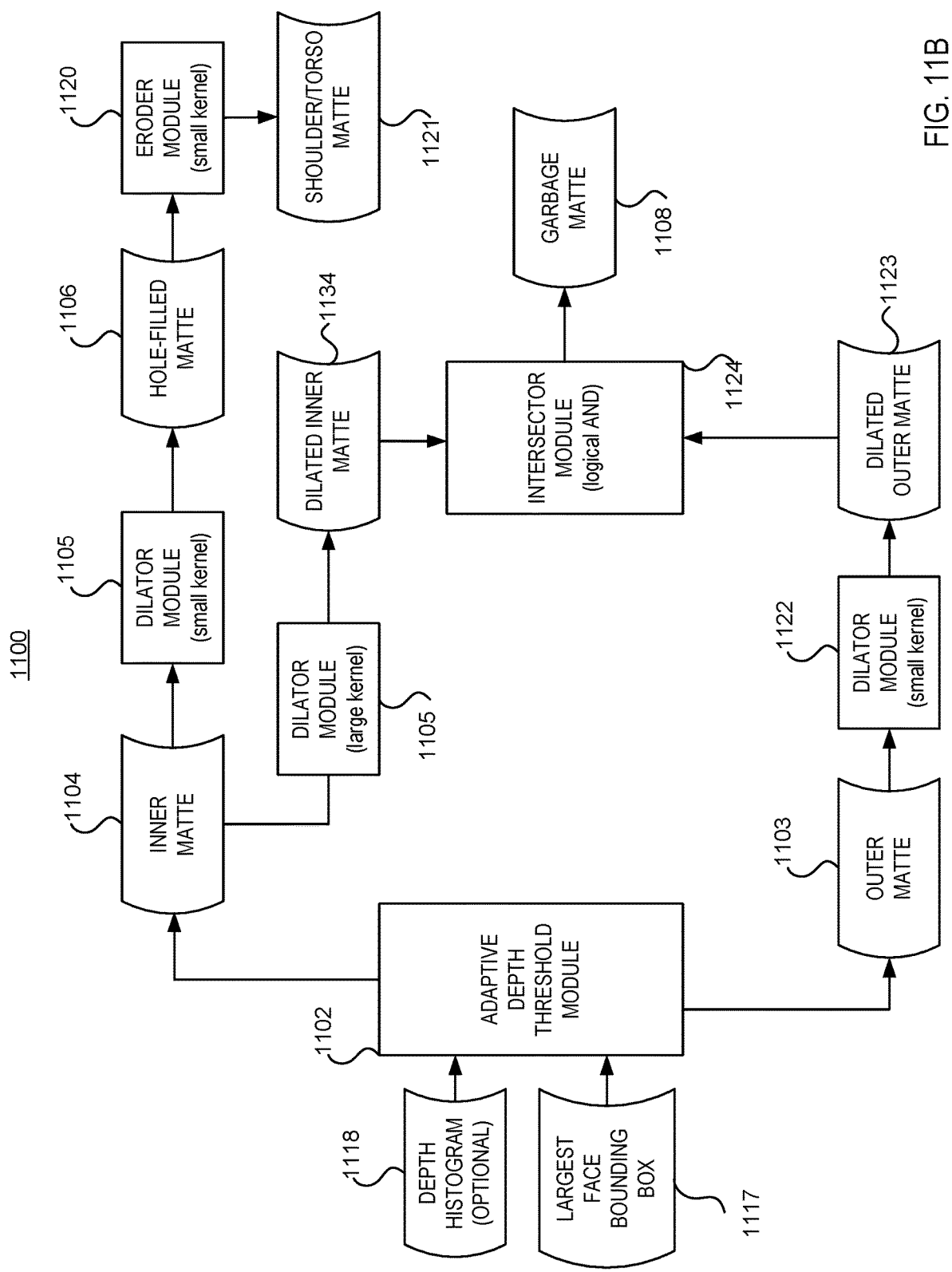

Referring to FIG. 11B, the generation of garbage matte 1108 and shoulder/torso matte 1121 referenced above will now be described. Adaptive depth threshold module 1102 receives as input largest face bounding box 1117 and optionally depth histogram 1118. In an embodiment, depth data 1101 is processed by depth histogram module 1137 using the processes previously described in reference to FIGS. 6C and 6D with a different histogram bin size.

Adaptive depth threshold module 1102 generates inner matte 1104 that includes depth data that is less than a threshold (foreground region) and outer matte 1103 that includes depth data that is less than the threshold or is unknown (conservative estimate of foreground region). In an embodiment, the threshold is the same for inner matte 1104 and outer matte 1103. The only difference is that outer matte 1103 also includes the pixels where the depth is unknown. For an IR depth sensor, the depth is unknown in parts of the image for at least four reasons: 1) if the background object is too far away (e.g., farther than 4 meters from the camera), then the IR dot projector pattern is too faint; 2) there is interference from other light sources (usually the sun); 3) the part of the object is in the "shadow" because the IR dot projector cannot be located in the same physical location as the IR camera; and 4) the light reflected from glass, mirror or other shiny object. In an embodiment, the depth threshold is determined by the average depth of the center region of a face detected in the image data, plus an offset to include the back of the head, and (optionally include) the chair someone is sitting in. The threshold can be tuned to be smaller to exclude the chair from the foreground.

Inner matte 1104 is input into dilator module 1105 (small kernel) which generates hole filled matte 1106. Hold filled matte 1106 is input into eroder module 1120 (small kernel) to generate shoulder/torso matte 1121. Shoulder/torso matte 1121 is then input into combine module 1130, as previously described in reference to FIG. 11A. Inner matte 1104 is input into dilator module 1105 (large kernel) to generate dilated inner matte 1134, and outer matte 1103 is input into dilator module 1122 (small kernel) to generate dilated outer matte 1123.

Intersector module 1124 takes as inputs dilated inner matte 1134 and dilated outer matte 1123 and outputs garbage matte 1108, which is input into bitwise AND module 1129, as previously described in reference to FIG. 11A. In an embodiment, intersector module 1124 and bitwise AND module 1129 are implemented using a bitwise AND operation (for integers) to approximate a minimum operator or a multiply operator (which would work even if the matte and image data values are normalized floating point).

In an embodiment, eroder module 1120 erodes a binary image f by a structuring element s (denoted f⊖s) to produce a new binary image g=f⊖s with ones in all locations (x, y) of a structuring element's origin at which that structuring element s fits the input image f, e.g., g(x, y)=1 is s fits f and 0 otherwise, repeating for all pixel coordinates (x, y). Eroder module 1120 removes small-scale details from hole-filled matte 1106 and simultaneously reduces the size of regions of interest. By subtracting the eroded image from hole-filled matte 1106 the boundaries of each region can be found: b=f−(f⊖s) where f is an image of the regions, s is a 3×3 structuring element, and b is an image of the region boundaries.

In an embodiment, dilator module 1105 dilates a binary image f by a structuring element s (denoted f⊖s) produces a new binary image g=f⊖s with ones in all locations (x, y) of a structuring element's origin at which that structuring element s hits the input image f, e.g., g(x, y)=1 ifs hits f and 0 otherwise, repeating for all pixel coordinates (x, y). Dilation has the opposite effect to erosion; it adds a layer of pixels to both the inner and outer boundaries of regions.

In an embodiment, a square structuring element is used and input image is scaled anamorphically, so that it is effectively a rectangular structuring element. In an alternative embodiment, asymmetric structuring element or more circular structuring element can be used to improve the tightness of garbage matte 1108 on the shadow side of a face, for example. Also, the dilated matte 1134 or shoulder/torso matte 1121 can be blurred to reduce the sharpness of garbage matte 1108 for a more aesthetically pleasing final matte 1116. In an embodiment, dilator module 1105 uses a small kernel to close holes around eyeglasses, fingers and other objects, and to "grow" the foreground region to avoid cutting off high-resolution matte 1125 (which is nicely feathered) in the more commonly occurring cases (image data without high-contrast edges and without lighted-colored shirts). Eroder module 1120 is used to "shrink" the foreground region so that the background matte for the white shirt case does not show in the commonly occurring case.

Alternative Embodiment for Matte Processing

In an alternative embodiment, the following process can be used to process a matte as follows. The input is a coarse, noisy low resolution matte (1112). The steps are as follows:

1) perform local orientation estimation (find direction and strength of edge tangents and edge gradients)
2) apply bilateral filter in gradient direction (found in step 1)
3) apply bilateral filter in tangent direction (found in step 1)
4) repeat step 2 and 3 N times, where N is a positive integer
5) quantize the matte levels
6) difference of Gaussian filter in gradient direction (found in step 1)
7) smooth along the flow field and threshold (found in step 1)
8) combine the quantized output of the local edge orientation aligned bilateral filter (output of step 5) with the output of step 7.

The matte that is output after step 8 becomes one of the inputs to bitwise AND module 1129 (replacing low-resolution matte 1112) or replacing face matte 1131. In another embodiment, a variant of the above process takes two inputs like a joint bilateral filter or guided filter. One input to the guided filter is the RGB (or luma) image data 1132 and the other input is low-resolution matte 1112.

Figure 12A:
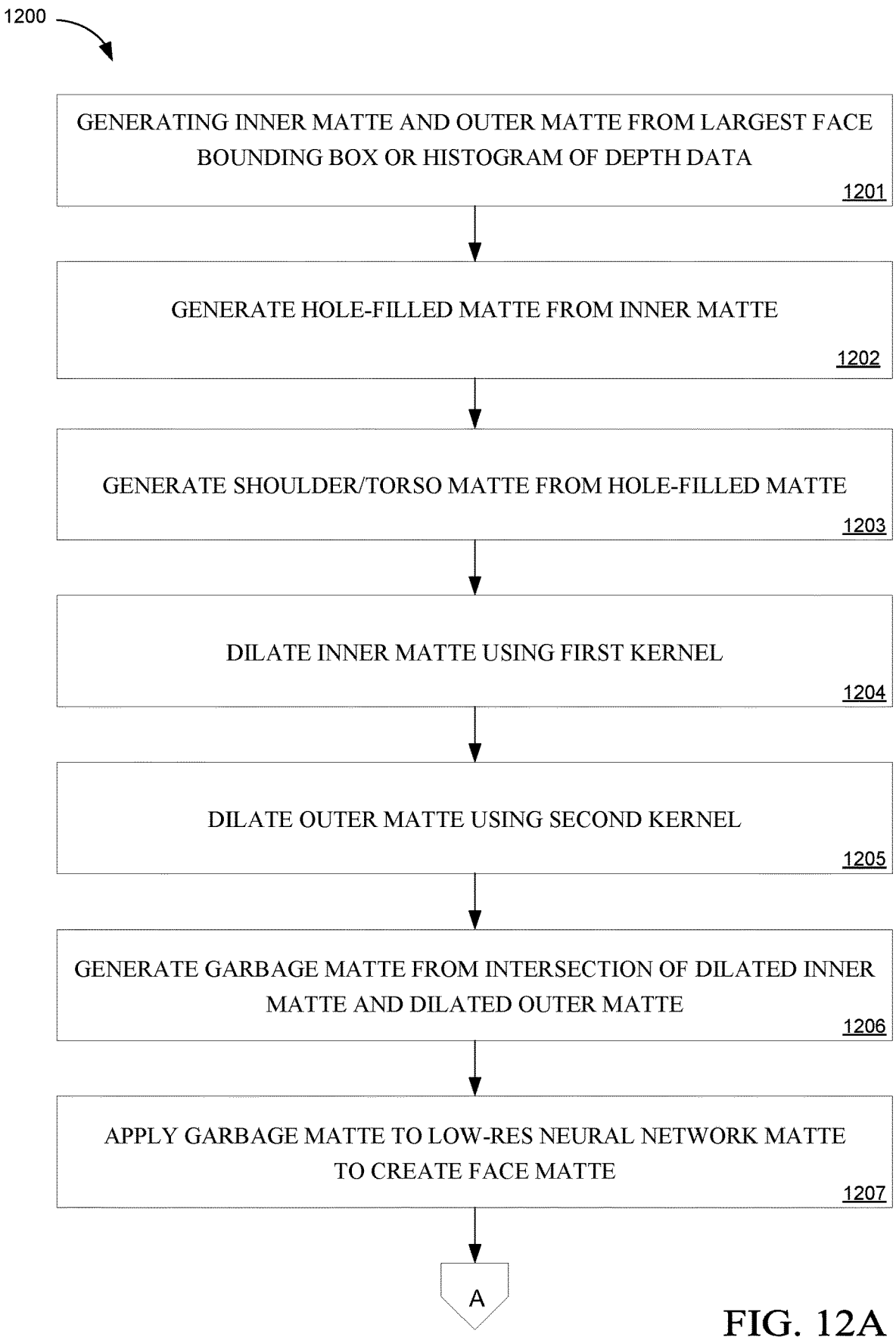
FIGS. 12A and 12B collectively is a flow diagram of a process for generating an AR selfie using machine learning, according to an embodiment.
Figure 12B:
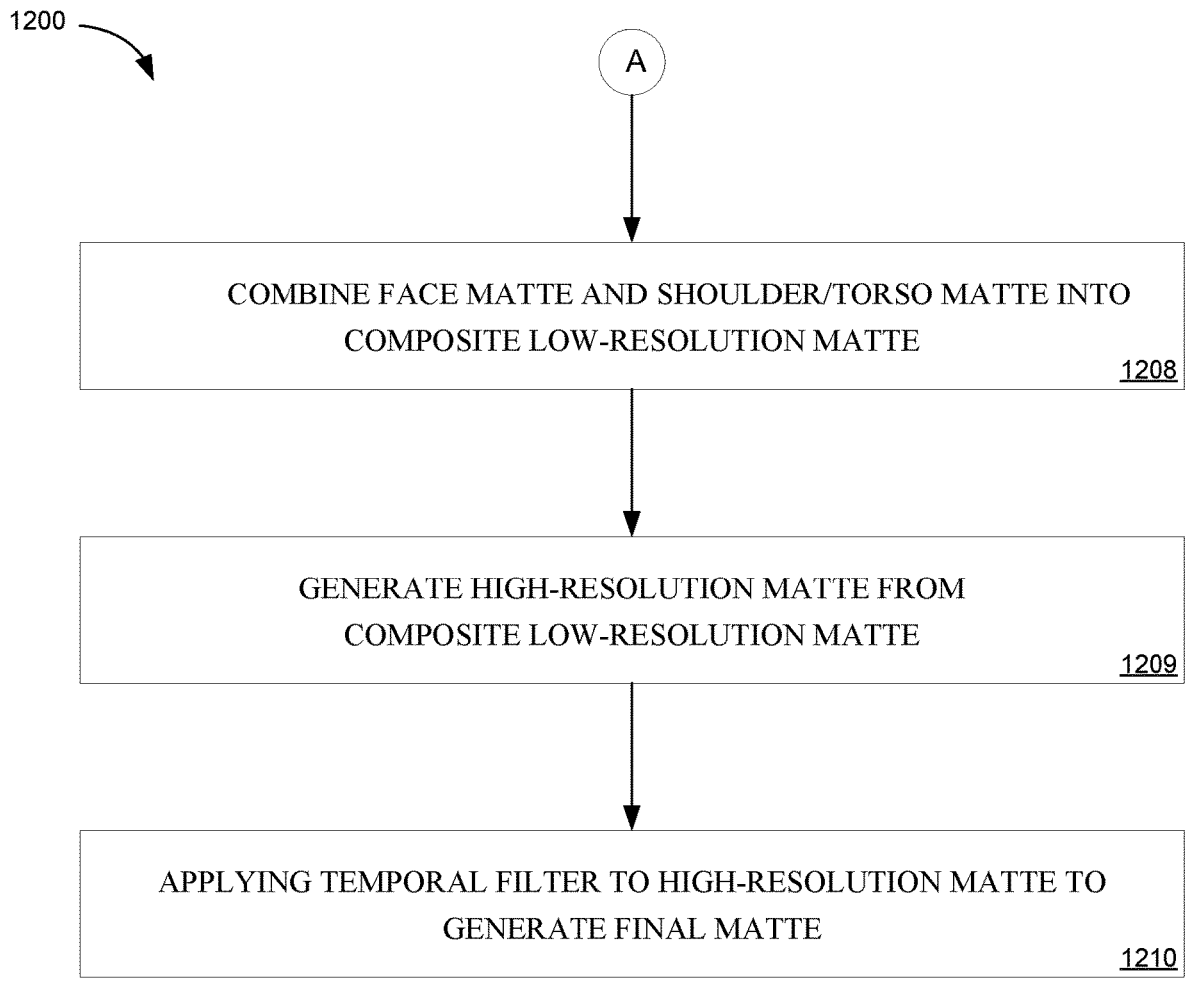

FIGS. 12A and 12B collectively is a flow diagram of a process for generating an AR selfie matte using machine learning, according to an embodiment. Process 1200 can be implemented using the device architecture described in reference to FIG. 13.

Referring to FIG. 12A, process 1200 begins by generating (1201) an inner matte and outer matte from the largest face bounding box or a histogram of depth data. For example, an adaptive depth threshold module can be used to generate the inner matte and outer matte, as described in reference to FIGS. 11A and 11B. Process 1200 continues by generating a hole-filled matte from the inner matte (1202) (e.g., using a dilating process with a small kernel), generating a shoulder/torso matte from the hole-filled matte (1203) (e.g., using an eroding process with a small kernel), dilating the inner matte using a first kernel (small kernel) (1204), dilating the outer matte using a second kernel that is smaller than the first kernel (1205), generating a garbage matte from the intersection (e.g., bitwise AND) of the dilated inner matte and the dilated outer matte (1206), and then applying the garbage matte to the low-resolution matte output by a neural network (e.g., a convolutional neural network) to create a face matte (1207), as described in reference to FIGS. 11A and 11B. Note that using a bitwise AND or bitwise OR assumes that the output of dilation and erosion is converted from a single bit per pixel to an integer mask representation that is all 1's for binary 1 and all 0's for binary 0. For example, in C language code: unsigned char mask=(bit)?~0:0;

Referring to FIG. 12B, process 1200 continues by combining the face matte and shoulder/torso matte into a composite low-resolution matte (1208), generating a high-resolution matte from the composite low resolution matte (1209) (e.g., using a guided filter with a luma image as the guidance image) and applying a temporal filter (e.g., a motion adaptive temporal filter) to the high-resolution matte to generate a final matte (1210), as described in reference to FIGS. 11A and 11B.

Example Device Architecture

Figure 13:
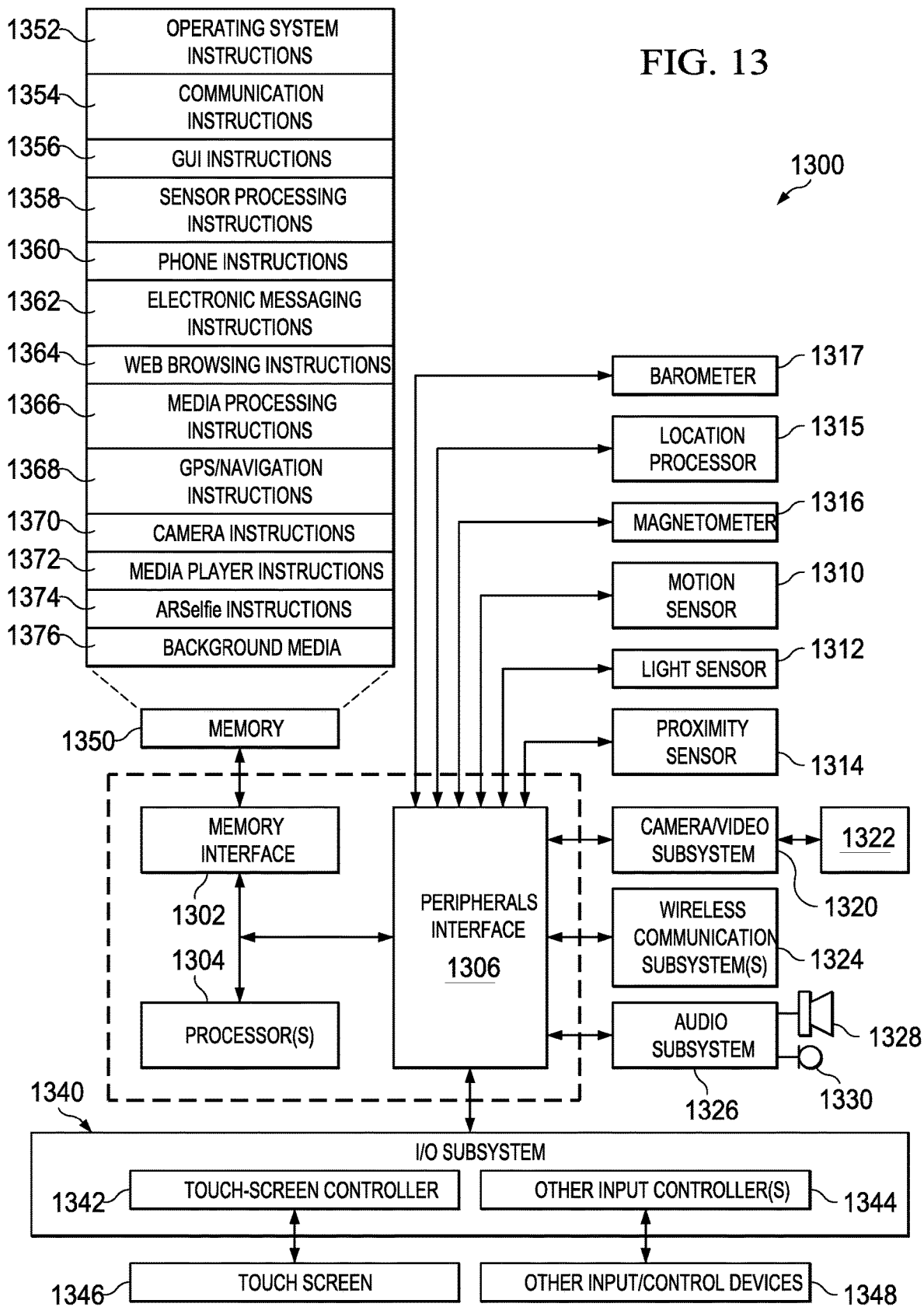
FIG. 13 illustrates device architecture for implementing the features and process described in reference to FIGS. 1-12, according to an embodiment.

FIG. 13 illustrates a device architecture for implementing the features and process described in reference to FIGS. 1-12, according to an embodiment. Architecture 1300 can include memory interface 1302, one or more data processors, video processors, co-processors, image processors and/or other processors 1304, and peripherals interface 1306. Memory interface 1302, one or more processors 1304 and/or peripherals interface 1306 can be separate components or can be integrated in one or more integrated circuits. The various components in architecture 1300 can be coupled by one or more communication buses or signal lines.

Sensors, devices and subsystems can be coupled to peripherals interface 1306 to facilitate multiple functionalities. For example, one or more motion sensors 1310, light sensor 1312 and proximity sensor 1314 can be coupled to peripherals interface 1306 to facilitate motion sensing (e.g., acceleration, rotation rates), lighting and proximity functions of the mobile device. Location processor 1315 can be connected to peripherals interface 1306 to provide geo-positioning and process sensor measurements. In some implementations, location processor 1315 can be a GNSS receiver, such as a Global Positioning System (GPS) receiver chip. Electronic magnetometer 1316 (e.g., an integrated circuit chip) can also be connected to peripherals interface 1306 to provide data that can be used to determine the direction of magnetic North. Electronic magnetometer 1316 can provide data to an electronic compass application. Motion sensor(s) 1310 can include one or more accelerometers and/or gyros configured to determine change of speed and direction of movement of the mobile device. Barometer 1317 can be configured to measure atmospheric pressure around the mobile device.

Camera subsystem 1320 and one or more cameras 1322 (e.g. forward-facing camera and backward-facing camera) for capturing digital photographs and recording video clips, include videos and images used for generating an AR selfie, as described in reference to FIGS. 1-10.

Communication functions can be facilitated through one or more wireless communication subsystems 1324, which can include radio frequency (RF) receivers and transmitters (or transceivers) and/or optical (e.g., infrared) receivers and transmitters. The specific design and implementation of the communication subsystem 1324 can depend on the communication network(s) over which a mobile device is intended to operate. For example, architecture 1300 can include communication subsystems 1324 designed to operate over a GSM network, a GPRS network, an EDGE network, a Wi-Fi™ or Wi-Max™ network and a Bluetooth™ network. In particular, the wireless communication subsystems 1324 can include hosting protocols, such that the mobile device can be configured as a base station for other wireless devices.

Audio subsystem 1326 can be coupled to a speaker 1328 and a microphone 1330 to facilitate voice-enabled functions, such as voice recognition, voice replication, digital recording and telephony functions. Audio subsystem 1326 can be configured to receive voice commands from the user.

I/O subsystem 1340 can include touch surface controller 1342 and/or other input controller(s) 1344. Touch surface controller 1342 can be coupled to a touch surface 1346 or pad. Touch surface 1346 and touch surface controller 1342 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1346. Touch surface 1346 can include, for example, a touch screen. I/O subsystem 1340 can include a haptic engine or device for providing haptic feedback (e.g., vibration) in response to commands from a processor.

Other input controller(s) 1344 can be coupled to other input/control devices 1348, such as one or more buttons, rocker switches, thumb-wheel, infrared port, USB port and/ or a pointer device such as a stylus. The one or more buttons (not shown) can include an up/down button for volume control of speaker 1328 and/or microphone 1330. Touch surface 1346 or other controllers 1344 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1346; and a pressing of the button for a second duration that is longer than the first duration may turn power to the mobile device on or off. The user may be able to customize a functionality of one or more of the buttons. The touch surface 1346 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1302 can be coupled to memory 1350. Memory 1350 can include high-speed random access memory and/or non-volatile memory, such as one or more magnetic disk storage devices, one or more optical storage devices and/or flash memory (e.g., NAND, NOR). Memory 1350 can store operating system 1352, such as iOS, Darwin, RTXC, LINUX, UNIX, OS X, WINDOWS, or an embedded operating system such as VxWorks. Operating system 1352 may include instructions for handling basic system services and for performing hardware dependent tasks. In some implementations, operating system 1352 can include a kernel (e.g., UNIX kernel).

Memory 1350 may also store communication instructions 1354 to facilitate communicating with one or more additional devices, one or more computers and/or one or more servers, such as, for example, instructions for implementing a software stack for wired or wireless communications with other devices. Memory 1350 may include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Location instructions 1368 to facilitate generic GNSS and location-related processes and instructions; and camera instructions 1370 to facilitate camera-related processes and functions for forward-facing and backward-facing cameras.

Memory 1350 further includes media player instructions 1372, and orientation-based, media presentation instructions 1374 for performing the features and processes described in reference to FIGS. 1-12. The memory 1350 may also store other software instructions (not shown), such as security instructions, web video instructions to facilitate web video-related processes and functions and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1350 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
    capturing, by a first camera of a mobile device, image data, the image data including an image of a subject in a physical, real-world environment;
    capturing, by a depth sensor of the mobile device, depth data indicating a distance of the subject from the camera in the physical, real-world environment;
    capturing, by one or more motion sensors of the mobile device, motion data indicating at least an orientation of the first camera in the physical, real-world environment;
    generating, by one or more processors of the mobile device, a virtual camera transform based on the motion data, the camera transform for determining an orientation of a virtual camera in a virtual environment;
    generating, by the one or more processors, a matte from the image data and the depth data, wherein generating the matte includes:
        inputting the image data and the depth data into a neural network;
        generating, by the neural network, a low-resolution matte using the image data and the depth data; and
        processing the low-resolution matte to remove artifacts in the low-resolution matte;
        generating a high-resolution matte from the processed low-resolution matte, where the high-resolution matte has higher resolution than the low-resolution matte;
    generating, by the one or more processors, a composite image data, using the image data, the high-resolution matte and a virtual background content, the virtual background content selected from the virtual environment using the camera transform; and
    causing to display, by the one or more processors, the composite image data on a display of the mobile device.

2. The method of claim 1, wherein processing the low-resolution matte to remove artifacts in the low-resolution matte, further comprises:
    generating an inner matte and an outer matte from at least one of a bounding box including a face of the subject or a histogram of the depth data;
    generating a hole-filled matte from the inner matte;
    generating a shoulder/torso matte from the hole-filled inner matte;
    dilating the inner matte using a first kernel;
    dilating the outer matte using a second kernel smaller than the first kernel;
    generating a garbage matte from an intersection of the dilated inner matte and the dilated outer matte;
    combining the low-resolution matte with the garbage matte to create a face matte;
    combining the face matte and the shoulder/torso matte into a denoised matte; and
    generating the high-resolution matte from the denoised matte.

3. The method of claim 2, further comprising:
    applying a temporal filter to the high-resolution matte to generate a final matte; and
    generating the composite image data, using the image data, the final matte and the virtual background content.

4. The method of claim 3, wherein applying the temporal filter to the high-resolution matte to generate a final matte further comprises:
    generating a per-pixel similarity map based on the image data and previous image data; and
    applying the temporal filter to the high-resolution matte using the similarity map and a previous final matte.

5. The method of claim 4, wherein the temporal filter is a linear weighted average of two frames with weights calculated per-pixel dependent on pixel similarity represented by the per-pixel similarity map.

6. The method of claim 2, wherein generating the high-resolution matte from the processed low-resolution matte, further comprises:
    generating a luma image from the image data; and
    upsampling, using a guided filter and the luma image, the denoised matte to the high-resolution matte.

7. The method of claim 2, wherein generating the shoulder/torso matte from the hole-filled inner matte further comprises:

dilating the inner matte to generate the hole-filled matte; and eroding the hole-filled matte to generate the shoulder/torso matte.

8. The method of claim 2, wherein the inner matte includes depth data that is less than a depth threshold, the outer matte includes depth data that is less than the depth threshold or is unknown, and the depth threshold is determined by an average depth of a center region of the subject's face detected in the image data and an offset to include the back of the subject's head.

9. The method of claim 1, wherein the neural network is a convolutional neural network for image segmentation.

10. A method comprising:

presenting a preview on a display of a mobile device, the preview including sequential frames of preview image data captured by a forward-facing camera of a mobile device positioned in close range of a subject, the sequential frames of preview image data including close range image data of the subject and image data of a background behind the subject in a physical, real world environment;

receiving a first user input to apply a virtual environment effect;

capturing, by a depth sensor of the mobile device, depth data indicating a distance of the subject from the forward-facing camera in the physical, real-world environment;

capturing, by one or more sensors of the mobile device, orientation data indicating at least an orientation of the forward-facing camera in the physical, real-world environment;

generating, by one or more processors of the mobile device, a camera transform based on the orientation data, the camera transform describing an orientation of a virtual camera in a virtual environment;

generating, by the one or more processors, a matte from the sequential frames of image data and the depth data, wherein generating the matte includes:

inputting the image data and the depth data into a neural network;

generating, by the neural network, a low-resolution matte using the image data and the depth data; and processing the low-resolution matte to remove artifacts in the low-resolution matte;

generating a high-resolution matte from the processed low-resolution matte, where the high-resolution matte has higher resolution than the low-resolution matte;

generating, by the one or more processors, composite sequential frames of image data, including the sequential frames of image data, the high-resolution matte and a virtual background content, the virtual background content selected from the virtual environment using the camera transform; and causing display, by the one or more processors, of the composite sequential frames of image data.

11. A system comprising:

a display;

a camera;

a depth sensor;

one or more motion sensors;

one or more processors;

memory coupled to the one or more processors and storing instructions that when executed by the one or more processors, cause the one or more processors to perform operations comprising:

capturing, by the camera, image data, the image data including an image of a subject in a physical, real-world environment;

capturing, by the depth sensor, depth data indicating a distance of the subject from the camera in the physical, real-world environment;

capturing, by the one or more motion sensors, motion data indicating at least an orientation of the camera in the physical, real-world environment;

generating a virtual camera transform based on the motion data, the camera transform for determining an orientation of a virtual camera in a virtual environment;

generating a matte from the image data and the depth data, wherein generating the matte includes:

inputting the image data and the depth data into a neural network;

generating, by the neural network, a low-resolution matte using the image data and the depth data; and processing the low-resolution matte to remove artifacts in the low-resolution matte;

generating a high-resolution matte from the processed low-resolution matte, where the high-resolution matte has higher resolution than the low-resolution matte;

generating a composite image data, using the image data, the high-resolution matte and a virtual background content, the virtual background content selected from the virtual environment using the camera transform; and causing to display the composite image data on the display.

12. The system of claim 11, wherein processing the low-resolution matte to remove artifacts in the low-resolution matte, further comprises:

generating an inner matte and an outer matte from at least one of a bounding box including a face of the subject or a histogram of the depth data;

generating a hole-filled matte from the inner matte;

generating a shoulder/torso matte from the hole-filled inner matte;

dilating the inner matte using a first kernel;

dilating the outer matte using a second kernel smaller than the first kernel;

generating a garbage matte from an intersection of the dilated inner matte and the dilated outer matte;

combining the low-resolution matte with the garbage matte to create a face matte;

combining the face matte and the shoulder/torso matte into a denoised matte; and generating the high-resolution matte from the denoised matte.

13. The system of claim 12, the operations further comprising:

applying a temporal filter to the high-resolution matte to generate a final matte; and generating the composite image data, using the image data, the final matte and the virtual background content.

14. The system of claim 13, wherein applying the temporal filter to the high-resolution matte to generate a final matte further comprises:

generating a per-pixel similarity map based on the image data and previous image data; and applying the temporal filter to the high-resolution matte using the similarity map and a previous final matte.

15. The system of claim 14, wherein the temporal filter is a linear weighted average of two frames with weights calculated per-pixel dependent on pixel similarity represented by the per-pixel similarity map.

16. The system of claim 12, wherein generating the high-resolution matte from the processed low-resolution matte, further comprises:
generating a luma image from the image data; and
upsampling, using a guided filter and the luma image, the denoised matte to the high-resolution matte.

17. The system of claim 12, wherein generating the shoulder/torso matte from the hole-filled inner matte further comprises:
dilating the inner matte to generate the hole-filled matte; and
eroding the hole-filled matte to generate the shoulder/torso matte.

18. The system of claim 12, wherein the inner matte includes depth data that is less than a depth threshold, the outer matte includes depth data that is less than the depth threshold or is unknown, and the depth threshold is determined by an average depth of a center region of the subject's face detected in the image data and an offset to include the back of the subject's head.

19. A system comprising:
a display;
a forward-facing camera;
a depth sensor;
one or more motion sensors;
one or more processors;
memory coupled to the one or more processors and storing instructions that when executed by the one or more processors, cause the one or more processors to perform operations comprising:
presenting a preview on the display, the preview including sequential frames of preview image data captured by the forward-facing camera positioned in close range of a subject, the sequential frames of preview image data including close range image data of the subject and image data of a background behind the subject in a physical, real world environment;
receiving a first user input to apply a virtual environment effect;
capturing, by the depth sensor, depth data indicating a distance of the subject from the forward-facing camera in the physical, real-world environment;
capturing, by the one or more sensors, orientation data indicating at least an orientation of the forward-facing camera in the physical, real-world environment;
generating, by the one or more processors, a camera transform based on the orientation data, the camera transform describing an orientation of a virtual camera in a virtual environment;
generating, by the one or more processors, a matte from the sequential frames of image data and the depth data, wherein generating the matte includes:
inputting the image data and the depth data into a neural network;
generating, by the neural network, a low-resolution matte; and
processing the low-resolution matte to remove artifacts in the low-resolution matte;
generating a high-resolution matte from the processed low-resolution matte, where the high-resolution matte has higher resolution than the low-resolution matte;
generating, by the one or more processors, composite sequential frames of image data, including the sequential frames of image data, the high-resolution matte and a virtual background content, the virtual background content selected from the virtual environment using the camera transform; and
displaying, on the display, the composite sequential frames of image data.

20. The system of claim 19, wherein processing the low-resolution matte to remove artifacts in the low-resolution matte, further comprises:
generating an inner matte and an outer matte from at least one of a bounding box including a face of the subject or a histogram of the depth data;
generating a hole-filled matte from the inner matte;
generating a shoulder/torso matte from the hole-filled inner matte;
dilating the inner matte using a first kernel;
dilating the outer matte using a second kernel smaller than the first kernel;
generating a garbage matte from an intersection of the dilated inner matte and the dilated outer matte;
combining the low-resolution matte with the garbage matte to create a face matte;
combining the face matte and the shoulder/torso matte into a denoised matte; and
generating the high-resolution matte from the denoised matte.

* * * * *

UNITED STATES PATENT AND TRADEMARK OFFICE
CERTIFICATE OF CORRECTION

PATENT NO. : 10,839,577 B2
APPLICATION NO. : 16/177408
DATED : November 17, 2020
INVENTOR(S) : Horie et al.

Page 1 of 1

It is certified that error appears in the above-identified patent and that said Letters Patent is hereby corrected as shown below:

In the Claims

Column 25, Line 21-22, in Claim 10, delete "real world" and insert -- real-world --;

Column 27, Line 38, in Claim 19, delete "real world" and insert -- real-world --.

Signed and Sealed this
Sixth Day of April, 2021

Drew Hirshfeld
*Performing the Functions and Duties of the
Under Secretary of Commerce for Intellectual Property and
Director of the United States Patent and Trademark Office*